US010862955B2

(12) United States Patent
Sankar et al.

(10) Patent No.: US 10,862,955 B2
(45) Date of Patent: Dec. 8, 2020

(54) DISTRIBUTING SERVICE SESSIONS

(71) Applicant: A10 NETWORKS, INC., San Jose, CA (US)

(72) Inventors: Swaminathan Sankar, San Jose, CA (US); Hasnain Karampurwala, Santa Clara, CA (US); Rahul Gupta, Fremont, CA (US); Gurudeep Kamat, San Jose, CA (US); Rajkumar Jalan, Saratoga, CA (US)

(73) Assignee: A10 Networks, Inc., San Jose, CA (US)

( * ) Notice: Subject to any disclaimer, the term of this patent is extended or adjusted under 35 U.S.C. 154(b) by 14 days.

(21) Appl. No.: 16/004,265

(22) Filed: Jun. 8, 2018

(65) Prior Publication Data
US 2018/0295182 A1 Oct. 11, 2018

Related U.S. Application Data

(63) Continuation of application No. 14/279,270, filed on May 15, 2014, now Pat. No. 10,021,174, which is a (Continued)

(51) Int. Cl.
*H04L 29/08* (2006.01)
*H04L 12/725* (2013.01)

(52) U.S. Cl.
CPC ........ *H04L 67/1004* (2013.01); *H04L 45/306* (2013.01); *H04L 67/1012* (2013.01)

(58) Field of Classification Search
CPC ....... H04L 47/125; H04L 47/33; H04L 47/115
See application file for complete search history.

(56) References Cited

U.S. PATENT DOCUMENTS 5,218,602 A   6/1993 Grant et al.
5,432,908 A   7/1995 Heddes et al.
(Continued)

FOREIGN PATENT DOCUMENTS

CN   1372662   10/2002
CN   1449618   10/2003
(Continued)

OTHER PUBLICATIONS

Abe, et al., "Adaptive Split Connection Schemes in Advanced Relay Nodes," IEICE Technical Report, 2010, vol. 109 (438), pp. 25-30.
(Continued)

*Primary Examiner* — Nicholas R Taylor
*Assistant Examiner* — Sanjoy Roy
(74) *Attorney, Agent, or Firm* — Keith Kline; The Kline Law Firm PC

(57) ABSTRACT

Provided are methods and systems for dynamically distributing a service session from a client device. The method may commence with receiving a packet associated with the service session from the client device by a gateway node. The method may include determining that the packet matches a service address in a forwarding policy. The method may continue with selecting one of a plurality of forwarding nodes for sending the packet to the one of the plurality of forwarding nodes. The method may include receiving the packet of the service session by the one of the plurality of forwarding nodes. The method may continue with determining that the packet matches the service address serviced by a servicing node of a plurality of servicing nodes. The method may further include sending the packet to the servicing node for forwarding the packet to a server by the servicing node.

19 Claims, 11 Drawing Sheets

Related U.S. Application Data continuation-in-part of application No. 14/029,656, filed on Sep. 17, 2013, now Pat. No. 9,705,800, and a continuation-in-part of application No. 13/716,128, filed on Dec. 15, 2012, now Pat. No. 9,106,561.

(60) Provisional application No. 61/705,618, filed on Sep. 25, 2012.

(56) References Cited

U.S. PATENT DOCUMENTS

| | | |
|---|---|---|
| 5,774,660 A | 6/1998 | Brendel et al. |
| 5,781,550 A | 7/1998 | Templin et al. |
| 5,875,185 A | 2/1999 | Wang et al. |
| 5,931,914 A | 8/1999 | Chiu |
| 5,935,207 A | 8/1999 | Logue et al. |
| 5,958,053 A | 9/1999 | Denker |
| 5,995,981 A | 11/1999 | Wikstrom |
| 6,003,069 A | 12/1999 | Cavill |
| 6,047,268 A | 4/2000 | Bartoli et al. |
| 6,131,163 A | 10/2000 | Wiegel |
| 6,141,749 A | 10/2000 | Coss et al. |
| 6,167,428 A | 12/2000 | Ellis |
| 6,219,706 B1 | 4/2001 | Fan et al. |
| 6,259,705 B1 | 7/2001 | Takahashi et al. |
| 6,321,338 B1 | 11/2001 | Porras et al. |
| 6,324,286 B1 | 11/2001 | Lai et al. |
| 6,360,265 B1 | 3/2002 | Falck et al. |
| 6,363,075 B1 | 3/2002 | Huang et al. |
| 6,374,300 B2 | 4/2002 | Masters |
| 6,389,462 B1 | 5/2002 | Cohen et al. |
| 6,415,329 B1 | 7/2002 | Gelman et al. |
| 6,459,682 B1 | 10/2002 | Ellesson et al. |
| 6,519,243 B1 | 2/2003 | Nonaka et al. |
| 6,535,516 B1 | 3/2003 | Leu et al. |
| 6,578,066 B1 | 6/2003 | Logan et al. |
| 6,587,866 B1 * | 7/2003 | Modi .......... H04L 29/06 709/226 |
| 6,658,114 B1 | 12/2003 | Farn et al. |
| 6,728,748 B1 | 4/2004 | Mangipudi et al. |
| 6,748,414 B1 | 6/2004 | Bournas |
| 6,772,334 B1 | 8/2004 | Glawitsch |
| 6,779,017 B1 | 8/2004 | Lamberton et al. |
| 6,779,033 B1 | 8/2004 | Watson et al. |
| 6,832,322 B1 | 12/2004 | Boden et al. |
| 6,952,728 B1 | 10/2005 | Alles et al. |
| 7,010,605 B1 | 3/2006 | Dharmarajan |
| 7,013,338 B1 | 3/2006 | Nag et al. |
| 7,013,482 B1 | 3/2006 | Krumel |
| 7,058,718 B2 | 6/2006 | Fontes et al. |
| 7,058,789 B2 | 6/2006 | Henderson et al. |
| 7,058,973 B1 | 6/2006 | Sultan |
| 7,069,438 B2 | 6/2006 | Balabine et al. |
| 7,076,555 B1 | 7/2006 | Orman et al. |
| 7,086,086 B2 | 8/2006 | Ellis |
| 7,111,162 B1 | 9/2006 | Bagepalli et al. |
| 7,143,087 B2 | 11/2006 | Fairweather |
| 7,167,927 B2 | 1/2007 | Philbrick et al. |
| 7,181,524 B1 | 2/2007 | Lele |
| 7,218,722 B1 | 5/2007 | Turner et al. |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,266,604 B1 | 9/2007 | Nathan et al. |
| 7,269,850 B2 | 9/2007 | Govindarajan et al. |
| 7,277,963 B2 | 10/2007 | Dolson et al. |
| 7,284,272 B2 | 10/2007 | Howard et al. |
| 7,290,050 B1 | 10/2007 | Smith et al. |
| 7,301,899 B2 | 11/2007 | Goldstone |
| 7,308,499 B2 | 12/2007 | Chavez |
| 7,308,710 B2 | 12/2007 | Yarborough |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,100 B1 | 5/2008 | Gunturu |
| 7,370,353 B2 | 5/2008 | Yang |
| 7,373,500 B2 | 5/2008 | Ramelson et al. |
| 7,391,725 B2 | 6/2008 | Huitema et al. |
| 7,398,317 B2 | 7/2008 | Chen et al. |
| 7,406,709 B2 | 7/2008 | Maher, III et al. |
| 7,423,977 B1 | 9/2008 | Joshi |
| 7,430,755 B1 | 9/2008 | Hughes et al. |
| 7,441,270 B1 | 10/2008 | Edwards et al. |
| 7,451,312 B2 | 11/2008 | Medvinsky et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,516,485 B1 | 4/2009 | Lee et al. |
| 7,529,242 B1 | 5/2009 | Lyle |
| 7,533,409 B2 | 5/2009 | Keane et al. |
| 7,552,323 B2 | 6/2009 | Shay |
| 7,568,041 B1 | 7/2009 | Turner et al. |
| 7,583,668 B1 | 9/2009 | Mayes et al. |
| 7,584,262 B1 | 9/2009 | Wang et al. |
| 7,584,301 B1 | 9/2009 | Joshi |
| 7,590,736 B2 | 9/2009 | Hydrie et al. |
| 7,591,001 B2 | 9/2009 | Shay |
| 7,603,454 B2 | 10/2009 | Piper |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,716,369 B2 | 5/2010 | Le Pennec et al. |
| 7,739,395 B1 | 6/2010 | Parlamas et al. |
| 7,747,748 B2 | 6/2010 | Allen |
| 7,751,409 B1 | 7/2010 | Carolan |
| 7,765,328 B2 | 7/2010 | Bryers et al. |
| 7,779,130 B1 | 8/2010 | Toutonghi |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,908,651 B2 | 3/2011 | Maher |
| 7,948,952 B2 * | 5/2011 | Hurtta .......... H04M 7/006 370/338 |
| 7,965,727 B2 | 6/2011 | Sakata et al. |
| 7,970,934 B1 | 6/2011 | Patel |
| 7,979,585 B2 | 7/2011 | Chen et al. |
| 7,983,258 B1 | 7/2011 | Ruben et al. |
| 7,990,847 B1 | 8/2011 | Leroy et al. |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,079,077 B2 | 12/2011 | Chen et al. |
| 8,090,866 B1 | 1/2012 | Bashyam et al. |
| 8,099,492 B2 | 1/2012 | Dahlin et al. |
| 8,122,116 B2 | 2/2012 | Matsunaga et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,244,876 B2 | 8/2012 | Sollee |
| 8,255,644 B2 | 8/2012 | Sonnier et al. |
| 8,266,235 B2 | 9/2012 | Jalan et al. |
| 8,291,487 B1 | 10/2012 | Chen et al. |
| 8,296,434 B1 | 10/2012 | Miller et al. |
| 8,312,507 B2 | 11/2012 | Chen et al. |
| 8,327,128 B1 | 12/2012 | Prince et al. |
| 8,332,925 B2 | 12/2012 | Chen et al. |
| 8,347,392 B2 | 1/2013 | Chess et al. |
| 8,379,515 B1 | 2/2013 | Mukerji |
| 8,387,128 B1 | 2/2013 | Chen et al. |
| 8,464,333 B1 | 6/2013 | Chen et al. |

(56) References Cited

U.S. PATENT DOCUMENTS

| | | |
|---|---|---|
| 8,499,093 B2 | 7/2013 | Grosser et al. |
| 8,520,615 B2 | 8/2013 | Mehta et al. |
| 8,539,075 B2 | 9/2013 | Bali et al. |
| 8,554,929 B1 | 10/2013 | Szeto et al. |
| 8,560,693 B1 | 10/2013 | Wang et al. |
| 8,584,199 B1 | 11/2013 | Chen et al. |
| 8,595,383 B2 | 11/2013 | Chen et al. |
| 8,595,791 B1 | 11/2013 | Chen et al. |
| 8,595,819 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,904,512 B1 | 12/2014 | Chen et al. |
| 8,914,871 B1 | 12/2014 | Chen et al. |
| 8,918,857 B1 | 12/2014 | Chen et al. |
| 8,943,577 B1 | 1/2015 | Chen et al. |
| 8,965,957 B2 | 2/2015 | Barros |
| 8,977,749 B1 | 3/2015 | Han |
| 8,990,262 B2 | 3/2015 | Chen et al. |
| 9,032,502 B1 | 5/2015 | Chen et al. |
| 9,094,364 B2 | 7/2015 | Jalan et al. |
| 9,106,561 B2 | 8/2015 | Jalan et al. |
| 9,118,618 B2 | 8/2015 | Davis |
| 9,118,620 B1 | 8/2015 | Davis |
| 9,124,550 B1 | 9/2015 | Chen et al. |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,258,332 B2 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,386,088 B2 | 7/2016 | Zheng et al. |
| 9,497,201 B2 | 11/2016 | Chen et al. |
| 9,531,846 B2 | 12/2016 | Han et al. |
| 9,544,364 B2 | 1/2017 | Jalan et al. |
| 9,596,286 B2 | 3/2017 | Kamat et al. |
| 9,602,442 B2 | 3/2017 | Han |
| 9,609,052 B2 | 3/2017 | Jalan et al. |
| 9,705,800 B2 | 7/2017 | Sankar et al. |
| 9,843,484 B2 | 12/2017 | Sankar et al. |
| 9,900,252 B2 | 2/2018 | Chiong |
| 9,906,422 B2 | 2/2018 | Jalan et al. |
| 9,906,591 B2 | 2/2018 | Jalan et al. |
| 9,942,152 B2 | 4/2018 | Jalan et al. |
| 9,942,162 B2 | 4/2018 | Golshan et al. |
| 9,960,967 B2 | 5/2018 | Chen et al. |
| 9,961,135 B2 | 5/2018 | Kannan et al. |
| 9,979,801 B2 | 5/2018 | Jalan et al. |
| 9,986,061 B2 | 5/2018 | Jalan et al. |
| 9,992,107 B2 | 6/2018 | Jalan et al. |
| 10,002,141 B2 | 6/2018 | Jalan et al. |
| 10,021,174 B2 | 7/2018 | Sankar et al. |
| 10,038,693 B2 | 7/2018 | Jalan et al. |
| 2001/0015812 A1 | 8/2001 | Sugaya |
| 2001/0049741 A1 | 12/2001 | Skene et al. |
| 2002/0026531 A1 | 2/2002 | Keane et al. |
| 2002/0032777 A1 | 3/2002 | Kawata et al. |
| 2002/0046348 A1 | 4/2002 | Brustoloni |
| 2002/0053031 A1 | 5/2002 | Bendinelli et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0141448 A1 | 10/2002 | Matsunaga |
| 2002/0143991 A1 | 10/2002 | Chow et al. |
| 2002/0178259 A1 | 11/2002 | Doyle et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0065762 A1 | 4/2003 | Stolorz et al. |
| 2003/0065950 A1 | 4/2003 | Yarborough |
| 2003/0081624 A1 | 5/2003 | Aggarwal et al. |
| 2003/0088788 A1 | 5/2003 | Yang |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0135653 A1 | 7/2003 | Marovich |
| 2003/0152078 A1 | 8/2003 | Henderson et al. |
| 2003/0167340 A1 | 9/2003 | Jonsson |
| 2003/0195962 A1 | 10/2003 | Kikuchi et al. |
| 2003/0229809 A1 | 12/2003 | Wexler et al. |
| 2004/0024880 A1* | 2/2004 | Srivastava ............... H04L 45/50 718/102 |
| 2004/0054920 A1 | 3/2004 | Wilson et al. |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0107360 A1 | 6/2004 | Herrmann et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0184442 A1 | 9/2004 | Jones et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0243718 A1 | 12/2004 | Fujiyoshi |
| 2004/0268358 A1* | 12/2004 | Darling ................... H04L 29/06 718/105 |
| 2005/0005207 A1 | 1/2005 | Hemeque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0027947 A1 | 2/2005 | Landin |
| 2005/0033985 A1 | 2/2005 | Xu et al. |
| 2005/0036501 A1 | 2/2005 | Chung et al. |
| 2005/0036511 A1 | 2/2005 | Baratakke et al. |
| 2005/0038898 A1 | 2/2005 | Mittig et al. |
| 2005/0044270 A1 | 2/2005 | Grove et al. |
| 2005/0050364 A1 | 3/2005 | Feng |
| 2005/0074001 A1 | 4/2005 | Mattes et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0114492 A1 | 5/2005 | Arberg et al. |
| 2005/0125276 A1 | 6/2005 | Rusu |
| 2005/0135422 A1 | 6/2005 | Yeh |
| 2005/0144468 A1 | 6/2005 | Northcutt et al. |
| 2005/0163073 A1 | 7/2005 | Heller et al. |
| 2005/0169285 A1 | 8/2005 | Wills et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0251856 A1 | 11/2005 | Araujo et al. |
| 2005/0259586 A1 | 11/2005 | Hafid et al. |
| 2005/0289231 A1 | 12/2005 | Harada et al. |
| 2006/0023721 A1 | 2/2006 | Miyake et al. |

(56) References Cited

U.S. PATENT DOCUMENTS

| | | |
|---|---|---|
| 2006/0031506 A1 | 2/2006 | Redgate |
| 2006/0036610 A1 | 2/2006 | Wang |
| 2006/0036733 A1 | 2/2006 | Fujimoto et al. |
| 2006/0062142 A1 | 3/2006 | Appanna et al. |
| 2006/0063517 A1 | 3/2006 | Oh et al. |
| 2006/0064440 A1 | 3/2006 | Perry |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0080446 A1 | 4/2006 | Bahl |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0126625 A1 | 6/2006 | Schollmeier et al. |
| 2006/0130064 A1* | 6/2006 | Srivastava .............. H04L 45/50 718/102 |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0195698 A1 | 8/2006 | Pinkerton et al. |
| 2006/0209789 A1 | 9/2006 | Gupta et al. |
| 2006/0227771 A1 | 10/2006 | Raghunath et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0002857 A1 | 1/2007 | Maher |
| 2007/0011419 A1 | 1/2007 | Conti |
| 2007/0019543 A1 | 1/2007 | Wei et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0124487 A1 | 5/2007 | Yoshimoto et al. |
| 2007/0156919 A1 | 7/2007 | Potti et al. |
| 2007/0165622 A1* | 7/2007 | O'Rourke ............. H04L 12/287 370/389 |
| 2007/0177506 A1 | 8/2007 | Singer et al. |
| 2007/0180226 A1 | 8/2007 | Schory et al. |
| 2007/0180513 A1 | 8/2007 | Raz et al. |
| 2007/0185998 A1 | 8/2007 | Touitou et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2007/0294694 A1 | 12/2007 | Jeter et al. |
| 2008/0031263 A1 | 2/2008 | Ervin et al. |
| 2008/0034111 A1 | 2/2008 | Kamath et al. |
| 2008/0034419 A1 | 2/2008 | Mullick et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0216177 A1 | 9/2008 | Yokosato et al. |
| 2008/0228781 A1 | 9/2008 | Chen et al. |
| 2008/0250099 A1 | 10/2008 | Shen et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0289044 A1 | 11/2008 | Choi |
| 2008/0291911 A1 | 11/2008 | Lee et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0113536 A1 | 4/2009 | Zhang et al. |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0210698 A1 | 8/2009 | Candelore |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0004004 A1 | 1/2010 | Browne-Swinburne et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0205310 A1 | 8/2010 | Altshuler et al. |
| 2010/0210265 A1 | 8/2010 | Borzsei et al. |
| 2010/0211669 A1 | 8/2010 | Dalgas et al. |
| 2010/0217793 A1 | 8/2010 | Preiss |
| 2010/0223630 A1 | 9/2010 | Degenkolb et al. |
| 2010/0228819 A1 | 9/2010 | Wei |
| 2010/0228878 A1 | 9/2010 | Xu et al. |
| 2010/0235507 A1 | 9/2010 | Szeto et al. |
| 2010/0235522 A1 | 9/2010 | Chen et al. |
| 2010/0238828 A1 | 9/2010 | Russell |
| 2010/0257278 A1 | 10/2010 | Gunturu |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2010/0333209 A1 | 12/2010 | Alve |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0060840 A1 | 3/2011 | Susai et al. |
| 2011/0099403 A1 | 4/2011 | Miyata et al. |
| 2011/0110294 A1 | 5/2011 | Valluri et al. |
| 2011/0145324 A1 | 6/2011 | Reinart et al. |
| 2011/0145390 A1* | 6/2011 | Kakadia .................. G06F 9/505 709/224 |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshchandra et al. |
| 2011/0307541 A1 | 12/2011 | Walsh et al. |
| 2011/0307606 A1 | 12/2011 | Cobb |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084460 A1 | 4/2012 | McGinnity et al. |
| 2012/0106355 A1 | 5/2012 | Ludwig |
| 2012/0117571 A1 | 5/2012 | Davis et al. |

(56) References Cited

U.S. PATENT DOCUMENTS

| | | | |
|---|---|---|---|
| 2012/0144014 | A1 | 6/2012 | Natham et al. |
| 2012/0151353 | A1 | 6/2012 | Joanny |
| 2012/0155495 | A1 | 6/2012 | Clee et al. |
| 2012/0170548 | A1 | 7/2012 | Rajagopalan et al. |
| 2012/0173759 | A1 | 7/2012 | Agarwal et al. |
| 2012/0191839 | A1 | 7/2012 | Maynard |
| 2012/0215910 | A1 | 8/2012 | Wada |
| 2012/0239792 | A1 | 9/2012 | Banerjee et al. |
| 2012/0240185 | A1 | 9/2012 | Kapoor et al. |
| 2012/0290727 | A1 | 11/2012 | Tivig |
| 2012/0297046 | A1 | 11/2012 | Raja et al. |
| 2013/0046876 | A1 | 2/2013 | Narayana et al. |
| 2013/0058335 | A1 | 3/2013 | Koponen et al. |
| 2013/0073743 | A1* | 3/2013 | Ramasamy ......... H04L 67/1027 709/238 |
| 2013/0074177 | A1 | 3/2013 | Varadhan et al. |
| 2013/0083725 | A1 | 4/2013 | Mallya et al. |
| 2013/0089099 | A1 | 4/2013 | Pollock et al. |
| 2013/0103817 | A1 | 4/2013 | Koponen et al. |
| 2013/0124713 | A1 | 5/2013 | Feinberg et al. |
| 2013/0148500 | A1 | 6/2013 | Sonoda et al. |
| 2013/0173795 | A1 | 7/2013 | McPherson |
| 2013/0176854 | A1 | 7/2013 | Chisu et al. |
| 2013/0191486 | A1 | 7/2013 | Someya et al. |
| 2013/0191548 | A1 | 7/2013 | Boddukuri et al. |
| 2013/0198385 | A1 | 8/2013 | Han et al. |
| 2013/0227165 | A1 | 8/2013 | Liu |
| 2013/0250765 | A1 | 9/2013 | Ehsan et al. |
| 2013/0250770 | A1 | 9/2013 | Zou et al. |
| 2013/0258846 | A1 | 10/2013 | Damola |
| 2013/0268646 | A1 | 10/2013 | Doron et al. |
| 2013/0282791 | A1 | 10/2013 | Kruglick |
| 2013/0311686 | A1 | 11/2013 | Fetterman et al. |
| 2013/0336159 | A1 | 12/2013 | Previdi et al. |
| 2014/0169375 | A1* | 6/2014 | Khan .................. H04L 45/308 370/392 |
| 2014/0226658 | A1 | 8/2014 | Kakadia et al. |
| 2014/0235249 | A1 | 8/2014 | Jeong et al. |
| 2014/0248914 | A1 | 9/2014 | Aoyagi et al. |
| 2014/0258465 | A1 | 9/2014 | Li |
| 2014/0286313 | A1 | 9/2014 | Fu et al. |
| 2014/0298091 | A1 | 10/2014 | Carlen et al. |
| 2014/0325649 | A1 | 10/2014 | Zhang |
| 2014/0334485 | A1 | 11/2014 | Jain et al. |
| 2014/0359052 | A1 | 12/2014 | Joachimpillai et al. |
| 2015/0092551 | A1* | 4/2015 | Moisand ............. H04L 12/4633 370/235 |
| 2015/0098333 | A1 | 4/2015 | Lin et al. |
| 2015/0156223 | A1 | 6/2015 | Xu et al. |
| 2015/0215436 | A1 | 7/2015 | Kancherla |
| 2015/0237173 | A1 | 8/2015 | Virkki et al. |
| 2015/0312268 | A1 | 10/2015 | Ray |
| 2015/0350048 | A1 | 12/2015 | Sampat et al. |
| 2016/0028640 | A1* | 1/2016 | Zhang .................. H04L 45/306 370/389 |
| 2016/0094470 | A1 | 3/2016 | Skog |
| 2016/0139910 | A1 | 5/2016 | Ramanathan et al. |
| 2016/0164792 | A1 | 6/2016 | Oran |
| 2018/0091420 | A1* | 3/2018 | Drake .................. H04L 45/38 |

FOREIGN PATENT DOCUMENTS

| | | |
|---|---|---|
| CN | 1473300 | 2/2004 |
| CN | 1529460 | 9/2004 |
| CN | 1575582 | 2/2005 |
| CN | 1714545 | 12/2005 |
| CN | 1725702 | 1/2006 |
| CN | 1910869 | 2/2007 |
| CN | 1921457 | 2/2007 |
| CN | 1937591 | 3/2007 |
| CN | 101004740 | 7/2007 |
| CN | 101094225 | 12/2007 |
| CN | 101163336 | 4/2008 |
| CN | 101169785 | 4/2008 |
| CN | 101189598 | 5/2008 |
| CN | 101193089 | 6/2008 |
| CN | 10247349 | 8/2008 |
| CN | 101261644 | 9/2008 |
| CN | 101495593 A | 7/2009 |
| CN | 101495993 B | 2/2011 |
| CN | 102143075 | 8/2011 |
| CN | 102546590 | 7/2012 |
| CN | 102571742 A | 7/2012 |
| CN | 102577252 A | 7/2012 |
| CN | 102918801 A | 2/2013 |
| CN | 103365654 | 10/2013 |
| CN | 103428261 | 12/2013 |
| CN | 103533018 | 1/2014 |
| CN | 101878663 | 6/2014 |
| CN | 103944954 | 7/2014 |
| CN | 104040990 | 9/2014 |
| CN | 104067569 A | 9/2014 |
| CN | 104106241 | 10/2014 |
| CN | 104137491 | 11/2014 |
| CN | 104796396 | 7/2015 |
| CN | 102577252 B | 3/2016 |
| CN | 102918801 B | 5/2016 |
| CN | 102571742 B | 7/2016 |
| CN | 104067569 B | 2/2017 |
| EP | 1209876 | 5/2002 |
| EP | 1482685 | 12/2004 |
| EP | 1720287 | 11/2006 |
| EP | 1770915 | 4/2007 |
| EP | 1885096 | 2/2008 |
| EP | 2057552 | 5/2009 |
| EP | 2215863 | 8/2010 |
| EP | 2296313 | 3/2011 |
| EP | 2577910 | 4/2013 |
| EP | 2622795 | 8/2013 |
| EP | 2647174 | 10/2013 |
| EP | 2667571 | 11/2013 |
| EP | 2760170 A1 | 7/2014 |
| EP | 2772026 A1 | 9/2014 |
| EP | 2575328 | 11/2014 |
| EP | 2901308 | 8/2015 |
| EP | 2760170 B1 | 12/2015 |
| EP | 2772026 B1 | 2/2017 |
| HK | 1182560 | 11/2013 |
| HK | 1183569 | 12/2013 |
| HK | 1183996 | 1/2014 |
| HK | 1189438 | 1/2014 |
| HK | 1188498 | 5/2014 |
| HK | 1190539 | 7/2014 |
| HK | 1182547 | 4/2015 |
| HK | 1198565 | 5/2015 |
| HK | 1198848 | 6/2015 |
| HK | 1199153 | 6/2015 |
| HK | 1199779 | 7/2015 |
| HK | 1200617 | 8/2015 |
| IN | 3764CHN2014 | 9/2015 |
| IN | 261CHE2014 | 1/2016 |
| IN | 1668CHENP2015 | 7/2016 |
| JP | H0997233 | 4/1997 |
| JP | H1196128 | 4/1999 |
| JP | H11338836 | 12/1999 |
| JP | 2000276432 | 10/2000 |
| JP | 2000307634 | 11/2000 |
| JP | 2001051859 | 2/2001 |
| JP | 2001298449 | 10/2001 |
| JP | 2002091936 | 3/2002 |
| JP | 2003141068 | 5/2003 |
| JP | 2003186776 | 7/2003 |
| JP | 2004350188 | 12/2004 |
| JP | 2005141441 | 6/2005 |
| JP | 2005518595 | 6/2005 |
| JP | 2006180295 | 7/2006 |
| JP | 2006332825 | 12/2006 |
| JP | 2006333245 | 12/2006 |
| JP | 2007048052 | 2/2007 |
| JP | 2008040718 | 2/2008 |
| JP | 2009500731 | 1/2009 |
| JP | 2011505752 | 2/2011 |
| JP | 2013059122 | 3/2013 |

(56) References Cited

FOREIGN PATENT DOCUMENTS

| | | |
|---|---|---|
| JP | 2013070423 | 4/2013 |
| JP | 2013078134 | 4/2013 |
| JP | 2013528330 | 7/2013 |
| JP | 5364101 B2 | 12/2013 |
| JP | 2014504484 | 2/2014 |
| JP | 5480959 B2 | 4/2014 |
| JP | 5579820 | 8/2014 |
| JP | 5579821 | 8/2014 |
| JP | 2014143686 | 8/2014 |
| JP | 2015507380 | 3/2015 |
| JP | 5855663 | 2/2016 |
| JP | 5906263 | 4/2016 |
| JP | 5913609 | 4/2016 |
| JP | 5946189 | 7/2016 |
| JP | 5963766 | 8/2016 |
| KR | 20080008340 | 1/2008 |
| KR | 100830413 | 5/2008 |
| KR | 20130096624 | 8/2013 |
| KR | 101576585 | 12/2015 |
| KR | 101632187 | 6/2016 |
| KR | 101692751 | 1/2017 |
| TW | 269763 | 2/1996 |
| TW | 375721 | 12/1999 |
| TW | 425821 | 3/2001 |
| TW | 444478 | 7/2001 |
| WO | WO2001013228 | 2/2001 |
| WO | WO2001014990 | 3/2001 |
| WO | WO2001045349 | 6/2001 |
| WO | WO2003073216 | 9/2003 |
| WO | WO2003103233 | 12/2003 |
| WO | WO2003103237 | 12/2003 |
| WO | WO2004084085 | 9/2004 |
| WO | WO2006065691 | 6/2006 |
| WO | WO2006098033 | 9/2006 |
| WO | WO2007076883 | 7/2007 |
| WO | WO2008021620 | 2/2008 |
| WO | WO2008053954 | 5/2008 |
| WO | WO2008078593 | 7/2008 |
| WO | WO2009073295 | 6/2009 |
| WO | WO2011049770 | 4/2011 |
| WO | WO2011079381 | 7/2011 |
| WO | WO2011149796 | 12/2011 |
| WO | WO2012050747 | 4/2012 |
| WO | WO2012075237 | 6/2012 |
| WO | WO2012083264 | 6/2012 |
| WO | WO2012097015 | 7/2012 |
| WO | WO2013070391 | 5/2013 |
| WO | WO2013081952 | 6/2013 |
| WO | WO2013096019 | 6/2013 |
| WO | WO2013112492 | 8/2013 |
| WO | WO2013189024 | 12/2013 |
| WO | WO2014031046 | 2/2014 |
| WO | WO2014052099 | 4/2014 |
| WO | WO2014088741 | 6/2014 |
| WO | WO2014093829 | 6/2014 |
| WO | WO2014138483 | 9/2014 |
| WO | WO2014144837 | 9/2014 |
| WO | WO2014179753 | 11/2014 |
| WO | WO2015153020 | 10/2015 |

OTHER PUBLICATIONS

Cardellini, et al., "Dynamic Load Balancing on Web-Server Systems," IEEE Internet Computing, 1999, vol. 3 (3), pp. 28-39.

Chiussi, et al., "A Network Architecture for MPLS-Based MIcro-Mobility," IEEE WCNC, 2002, pp. 1-8.

FreeBSD, "tcp—TCP Protocal," Linux Programmes Manual [online], 2007, [retrieved on Apr. 13, 2016], Retreived from the Internet: <https://www.freebsd.org/cgi/man.cgi?query=tcp&apropos=0&sektion=7&manpath=SuSe+Linux%2Fi386+11.0&format=asci>.

Gite, "Linux Tune Network Stack (Buffers Size) to Increase Networking Performance," nixCraft [online], 2009, [retreived on Apr. 13, 2016], Retreived from the Internet: <URL:http://www.cyberciti.biz/faq/linux-tcp-tuning/>.

Goldszmidt, et al., "NetDispatcher: A TCP Connection Router," IBM Researc Report, RC 20853, 1997, pp. 1-31.

Kjaer, et al., "Resource Allocation and Disturbance Rejection in Web Servers Using SLAs and Virtualized Servers," IEEE Transactions on Network Service Management, 2009, vol. 6 (4), pp. 226-239.

Koike, et al., "Transport Middleware for Network-Based Control," IEICE Technical Report, 2000, vol. 100 (53), pp. 13-18.

Noguchi, "Realizing the Highest Level "Layer 7" Switch"=Totally Managing Network Resources, Applications, and Users=, Computer & Network LAN, 2000, vol. 18 (1), pp. 109-112.

Ohnuma, "AppSwitch: 7th Layer Switch Provided with Full Setup and Report Tools," Interop Magazine, 2000, vol. 10 (6), pp. 148-150.

Sharifian, et al., "An Approximation-Based Load-Balancing Algorithm with Admission Control for Cluster Web Servers with Dynamic Workloads," The Journal of Supercomputing, 2010, vol. 53 (3), pp. 440-463.

Smith, et al., "Network Security Using NAT and NAPT ," IEEE ICON, 2002, pp. 355-360.

Spatscheck, et al., "Optimizing TCP Forwarder Performance," IEEE/ACM Transactions on Networking, 2000, vol. 8 (2), pp. 146-157.

Search Report and Written Opinion dated Apr. 7, 2014 for PCT Application No. PCT/US2013/075023.

Takahashi, "The Fundamentals of the Windows Network: Understanding the Mystery of the Windows Network from the Basics," Network Magazine, 2006, vol. 11 (7), pp. 32-35.

Wang, et al., "Shield: Vulnerability Driven Network Filters for Preventing Known Vulnerability Exploits," SIGCOMM, 2004, 12 pgs.

Yamamoto, et al., "Performance Evaluation of Window Size in Proxy-Based TCP for Multi-Hop Wireless Networks," IPSJ SIG Technical Reports, 2008, vol. 2008 (44), pp. 109-114.

* cited by examiner

DISTRIBUTING SERVICE SESSIONS

CROSS-REFERENCE TO RELATED APPLICATIONS

This patent application is a Continuation of U.S. patent application Ser. No. 14/279,270, titled "Distributing Service Sessions", filed May 15, 2014, which is a Continuation-in-Part of U.S. patent application Ser. No. 14/029,656, titled "Load Distribution in Data Networks," filed Sep. 17, 2013, now U.S. Pat. No. 9,705,800, which claims the priority benefit of U.S. provisional patent application No. 61/705,618, filed Sep. 25, 2012; and is a Continuation-in-Part of U.S. patent application Ser. No. 13/716,128, titled "Configuration of a Virtual Service Network," filed Dec. 15, 2012, now U.S. Pat. No. 9,106,561. The disclosure of each of the above referenced applications is incorporated herein by reference.

TECHNICAL FIELD

This disclosure relates generally to data processing and, more specifically, to distributing service sessions in service data networks.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Regular service load balancers such as server load balancers, application delivery controllers, and traffic managers, typically distribute a load among a plurality of servers providing network services such as web documents, voice calls, advertisements, enterprise applications, video streaming services, file transfers, gaming, or various broadband services. A network service is associated with an IP address. In an IP network, an IP address is assigned to a network device. Network routers and switches are designed to forward data packets addressed to the IP address to the assigned network computing device. However, currently, the same IP address cannot be assigned to multiple network computing devices connected with network routers and switches.

When a service provider deploys a network service, the service provider needs to consider changes in client demand from high demand to low demand. In one scenario, a software vendor provides software patches on a regular basis. Normally, a single service load balancer is capable of handling software patch download demand.

For example, when a software vendor rolls out a major software update, the software vendor should anticipate a dramatic increase in download demand shortly after the major software update is released. To handle the increasing demand, the software vendor can plan to add two additional service load balancers and four more patch servers. The software vendor could use different IP addresses for the additional service load balancers. However, this solution would require the client devices to learn the new IP addresses before requesting the software update service.

After a day of the major software update release, the software vendor experiences a substantial decline in service demand. The software vendor can remove some added service load balancers and patch servers. The client devices need to re-acquire the IP address of the remaining service load balancer in order to use the software patch service.

It is therefore desirable that there is a need to provide a scalable dynamic service network to distribute service sessions to a plurality of service load balancers according to a service address.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for dynamically distributing a service session from a client device. Specifically, according to one approach of the present disclosure, a system for dynamically distributing a service session from a client device is provided. The system may include a plurality of forwarding nodes and a gateway node. The gateway node may be configured to receive a packet of the service session from the client device. The gateway node may be further configured to determine that the packet matches a service address in a forwarding policy. Based on the determining that the packet matches the service address, the gateway node may select one of the plurality of forwarding nodes for sending the packet to the one of the plurality of forwarding nodes. The selection of the one of the plurality of forwarding nodes may be made based on the forwarding policy. The one of the plurality of forwarding nodes may be configured to receive the packet of the service session from the gateway node. The one of the plurality of forwarding nodes may be further configured to determine that the packet matches the service address serviced by a servicing node of a plurality of servicing nodes. The determination that the packet matches the service address may be made based on the forwarding policy. The one of the plurality of forwarding nodes may be further configured to send the packet to the servicing node for forwarding the packet to a server of a plurality of servers by the servicing node.

According to another approach of the present disclosure, there is provided a method for dynamically distributing a service session from a client device. The method may commence with receiving, by a gateway node, from the client device, a packet of the service session. The method may further include determining, by the gateway node, that the packet matches a service address in a forwarding policy. The method may continue with selecting, by the gateway node, based on the forwarding policy, one of a plurality of forwarding nodes for sending, by the gateway node, the packet to the one of the plurality of forwarding nodes. The method may further include receiving, by the one of the plurality of forwarding nodes, the packet of the service session from the gateway node. The method may continue with determining, by the one of the plurality of forwarding nodes, based on the forwarding policy, that the packet matches the service address serviced by a servicing node of a plurality of servicing nodes. The method may further include sending, by the one of the plurality of forwarding nodes, the packet to the servicing node for forwarding the packet to a server of a plurality of servers by the servicing node.

Additional objects, advantages, and features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
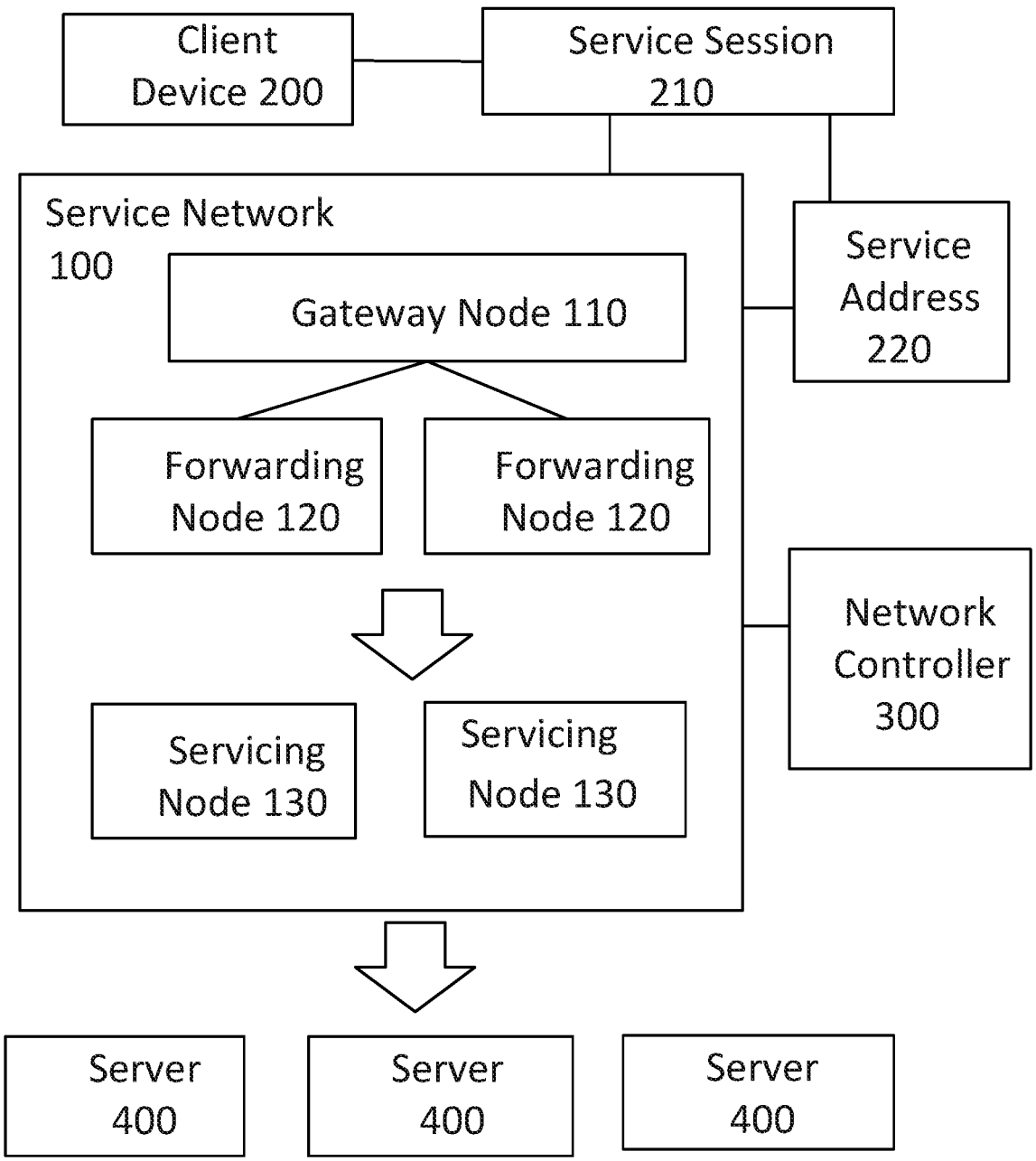
FIG. 1 is a block diagram showing a service data network for distributing a service session from a client to servers.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), game console, handheld gaming device, cellular phone, smart phone, smart television system, and so forth.

The method of the current disclosure may include receiving, by a forwarding node, a packet of a service session, determining by the forwarding node whether the packet is matching a service address, with the service address being associated with the service session. Responsive to the determination, the method can proceed with selecting a servicing node from a plurality of servicing nodes based on a forwarding policy, wherein each of the plurality of servicing nodes is associated with the service address and sending the packet to the selected servicing node. In some embodiments, the method may further include receiving the packet by the servicing node, determining whether the packet is a service request packet, selecting a server, with the server being configured to serve the service session, and sending the packet to the server. In certain embodiments, before receiving the packet by the forwarding node, the method can include receiving, by the gateway node, a notification and the packet, determining whether the packet matches the service address, selecting the forwarding node based on the notification, and sending the packet to the forwarding node.

Referring now to the drawings, FIG. 1 is a block diagram showing a service data network 100 for distributing a service session from client to servers and working environment of thereof, according to an example embodiment. The example service data network 100 includes one or more network nodes. The network nodes include at least one gateway node 110, one or more forwarding nodes 120, and one or more servicing nodes 130. In some embodiments, the service data network 100 can include assistant network nodes (not shown in FIG. 1), configured to carry out data communication between gateway node 110, forwarding nodes 120, and servicing nodes 130 of service data network 100. In certain embodiments, the service network 100 is connected to a network controller 300. The network controller 300 is configured to communicate to network nodes of the service data network 100.

According to some embodiments, service data network 100 can include an Ethernet network, an ATM network, a cellular network, a wireless network, a Frame Relay network, an optical network, an IP network or data network utilizing other physical layers, link layer capability, or network layers to carry data packets.

In some embodiments, the service data network 100 is connected to at least one client device 200. The client device 200 can be a personal computer (PC), a laptop, a smartphone, a cell phone, a tablet, a personal digital assistant (PDA), a desktop, a notebook, a set top box, a network connected device, a computer, a network connecting computing device, a network element such as an Ethernet switch, a router, or any network computing device seeking a service from a server.

In some embodiments, service data network 100 is connected to one or more servers 400. The server 400 may include a Web server, a video server, a music server, an e-commerce server, an enterprise application server, a news server, a mobile broadband service server, a messaging server, an email server, a game server, an app server, an Internet radio server, a storage server, a social network services server, or a network computing device. The network computing device is operable to provide services to a service session 210 coming from client device 200.

In some embodiments, service network 200 is configured to serve service address 220. The service address 220 represents a network address for service session 210 between client 200 and a server 400. In certain embodiments, the service address 220 includes one or more of an IP address, a TCP port number, a UDP port number, a data link layer identity, a VLAN identity, a network identity, and a service identity.

In some embodiments, client device 200 conducts service session 210 with server 400. Service session 210 may be a web page access session; an e-commerce transaction session; a video playing session; a music playing session; a file transfer session; an image downloading session; a message chat session; a session to send a message, a picture, a video, or a file; a game playing session; or any data communication session between client device 200 and server 400.

In certain embodiments, service session 210 includes one or more data packets sent by client 200. Data packets can be processed by service network 100 prior to being delivered to server 400. In some embodiments, data packets are received by the gateway node 110. Gateway node 110 is configured to examine data packets and determine whether to forward the data packets to forwarding node 120. Forwarding node 120 is configured to receive data packets of service session 210 from the gateway node, examine the data packets, and determine whether to forward the data packets to servicing node 130. In one embodiment, servicing node 130 is configured to receive data packets of service session 210, process the data packets, select server 400 to handle the service session 210, and forward the data packets to selected server 400.

Figure 2:
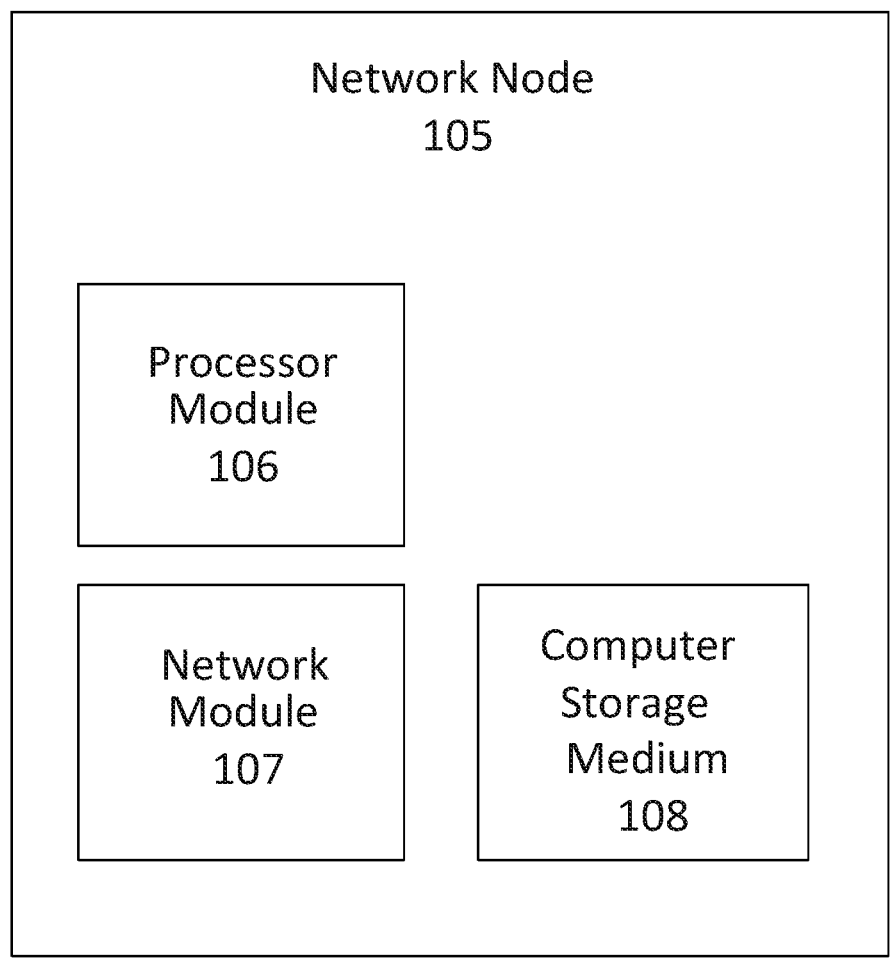
FIG. 2 is a block diagram showing components of an example network node.

Referring now to FIG. 2, components of an example network node 105 are shown. The example network node 105 of service network 100 comprises a processor module 106, a network module 107, and computer storage medium 108. In certain embodiment, processor module 106 includes one or more processors, which may be a micro-processor, an Intel processor, an AMD processor, a MIPS processor, an ARM-based processor, or a RISC processor. In other embodiments, processor module 106 includes one or more processor cores embedded in a processor. In some other embodiment, processor module 106 includes one or more embedded processors, or embedded processing elements in a Field Programmable Gate Array (FPGA), an ASIC, or Digital Signal Processor (DSP).

In some embodiment, network module 107 includes a network interface such as an Ethernet, optical network interface, a wireless network interface, T1/T3 interface, or a WAN or LAN interface. In certain embodiments, network module 107 includes a network processor.

In some embodiment, storage module 108 includes RAM, DRAM, SRAM, SDRAM or memory utilized by processor module 106 or network module 107. The storage module 108 can be configured to store data utilized by processor module 106.

In other embodiments, storage module 108 includes a hard disk drive, a solid state drive, an external disk, a DVD, a CD, or a readable external disk. Storage module 108 stores one or more computer programming instructions which when executed by processor module 106 and network module 107 implement one or more of the methods described in present disclosure.

Figure 3:
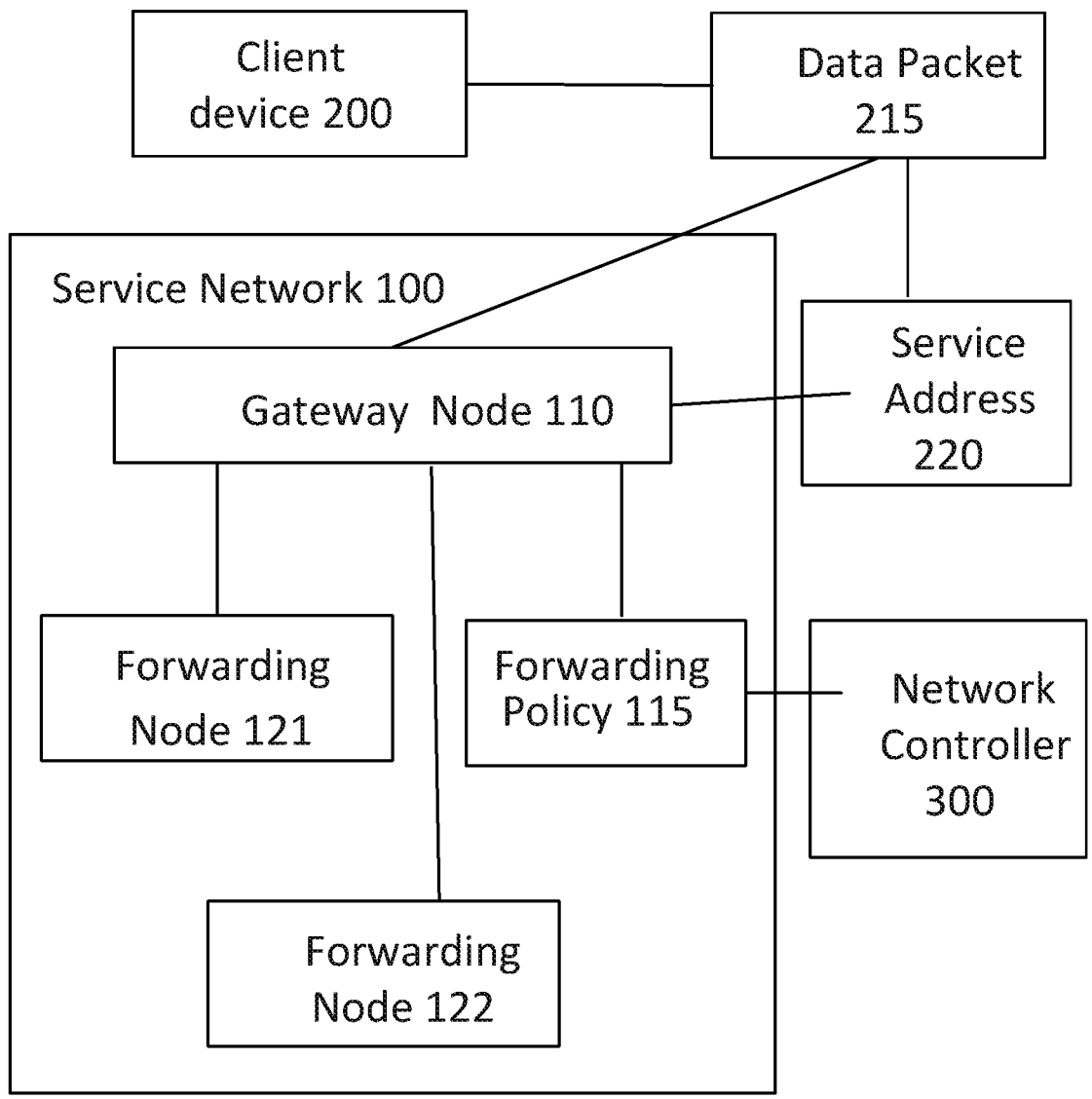
FIG. 3 is a block diagram showing an environment of a gateway node in a service data network.

FIG. 3 shows a block diagram showing an example working environment of a gateway node 110 of a service data network 100, according to an example embodiment. Details of service data network 100 and environment thereof are previously described in FIG. 1. According to an example embodiment, the client device 200 sends data packet 215 of service session 210 (shown in FIG. 1). In some embodiments, data packet 215 includes a service address 220. The gateway node 110 is configured to examine the data packet 215 and determine whether the data packet 215 matches the service address 220.

In certain embodiments, the data packet 215 includes service address 220 as a destination network address. Gateway node 110 can be configured to retrieve and determine whether the destination network address of the data packet 215 matches the service address 220. Upon determining that data packet 215 matches service address 220, the gateway node 110 checks a forwarding policy 115 to determine where to forward the data packet 215. In particular embodiments, the forwarding policy 115 can include a forwarding table, a TCAM table, a hash table, a look-up table, an application programming interface (API), or a set of computer programming instructions.

If, for example, the gateway node 110 is connected to forwarding node 121 and forwarding policy 115 indicates that forwarding node 121 is selected, then the gateway node 110 forwards the data packet 215 to the forwarding node 121.

If, for example, the gateway node 110 is connected to the forwarding node 121 and forwarding node 122, and the forwarding policy 215 indicates that the forwarding node 121 is selected, then the gateway node 110 forwards the data packet 215 to the forwarding node 121.

In some embodiments, forwarding policy 115 can include a criterion for selecting a forwarding node between the forwarding node 121 and the forwarding node 122. The criterion in forwarding policy 115 can indicate that the selection is based on the source network address of data packet 215. The gateway node 110 is configured to retrieve a source network address, which can include one or more of an IP address, a transport layer address, a link layer address, and a network identity. The gateway node 110 can be further configured to decide based on the retrieved source network address and the criterion of forwarding policy 115. In certain embodiments, gateway node 110 applies a hashing function, according to the criterion, to the retrieved source network address. In other embodiments, the gateway node 110 looks up a table using the retrieved source network address. In another embodiment, gateway node 110 processes only a portion of the retrieved source network address to determine a forwarding node. After the gateway node 110 determines and selects forwarding node 121 or 122 in accordance to criterion of the forwarding policy 115, the data packet 215 is sent to the selected forwarding node.

In some embodiments, prior to receiving data packet 215, gateway node 110 may receive one or more indications that the forwarding node 121 and the forwarding node 122 are capable of handling data packets for service address 220. In other embodiments, the gateway node 110 can be configured to store a prior forwarding policy and update the prior forwarding policy with the indications to create forwarding policy 115. In certain embodiments, the gateway node 110 is configured to receive the forwarding policy 115 from a network controller 300.

In some embodiments, the gateway node 110 includes a routing module implementing a routing protocol, which may be an IP routing protocol such as Open Shortest Path First (OSPF), ISIS (Intermediate System to Intermediate System), Routing Information Protocol (RIP), Border Gateway Protocol (BGP), E-BGP or I-BGP. The gateway node 110 receives one or more indications through one or more routing protocols indicating forwarding node 121 or forwarding node 122 are capable of handling data packets for service address 220.

In certain embodiments, the gateway node 110 includes an aggregated link, a link aggregated group, or a group of links connecting to the forwarding node 121 and the forwarding node 122. The gateway node 110 creates forwarding policy 115 to support a plurality of forwarding paths for service address 220, such as paths to both the forwarding node 121 and the forwarding node 122. In some embodiments, gateway node 110 can create the forwarding policy 115 based on ECMP (Equal Cost Multi-Path) routing, configuration of LAG (link aggregation group) or MLAG (multi-link aggregation group) to support multiple forwarding paths.

In some embodiments, forwarding policy 115 includes a criterion that the same forwarding node should be selected for data packets of the same service session, or data packets from a same client. In further embodiments, forwarding policy 115 includes a criterion that the same forwarding path should be selected for data packets of the same service session or from the same client. Such criteria are useful to assure that data packets of the same service session or from a same client are delivered to the same forwarding node or the same forwarding path.

Figure 4:
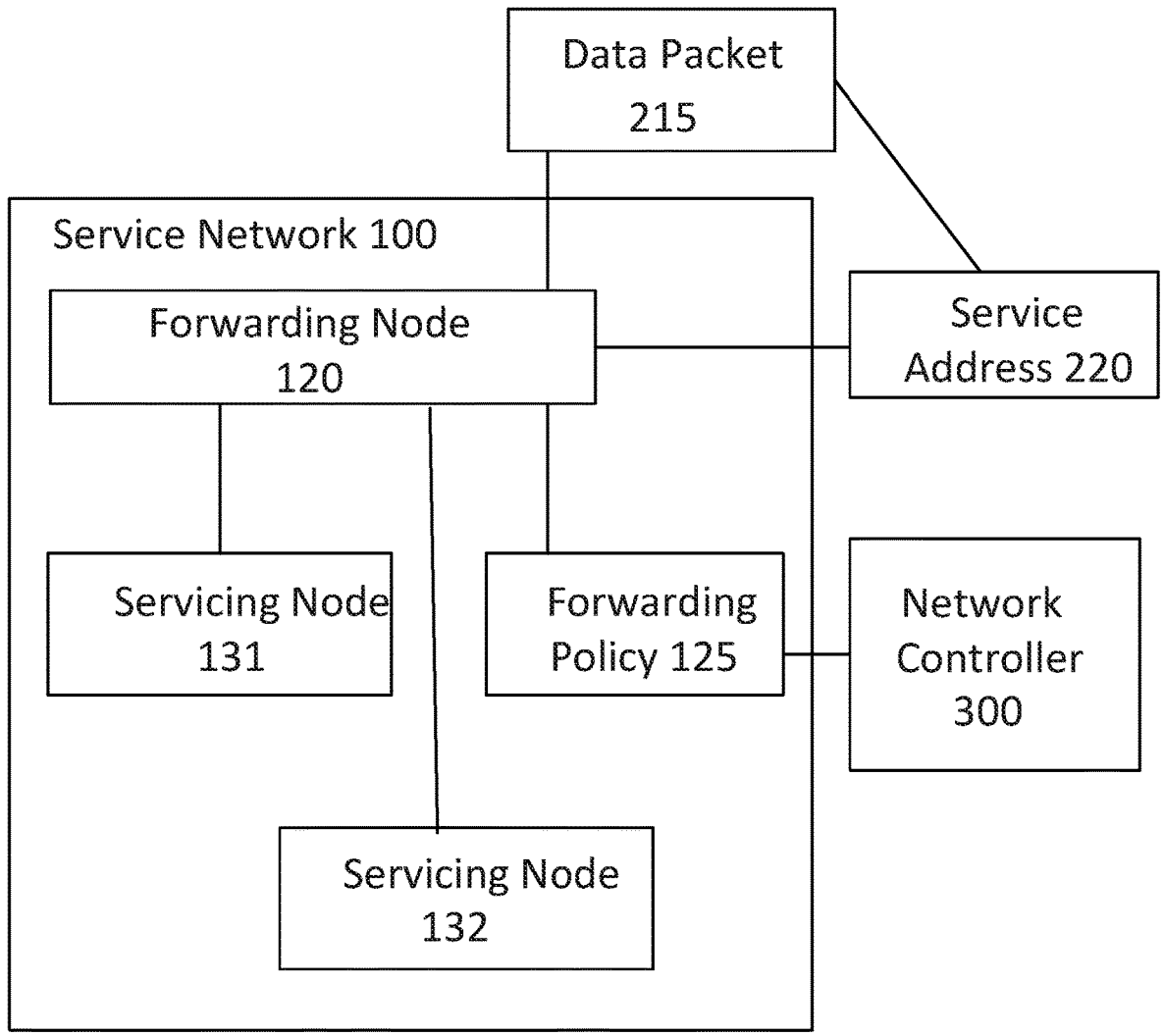
FIG. 4 is a block diagram showing an environment of a forwarding node in a service data network.

Referring now to FIG. 4, a block diagram of an example forwarding node 120 and environment thereof is shown, according to an example embodiment. Details of service data network 100 and environment thereof are previously described in FIG. 1. The forwarding node 120 receives data packet 215. The forwarding node 120 is further configured to examine the data packet 215 and determine whether the data packet 215 matches the service address 220. In some embodiments, the forwarding node 120 retrieves a destination network address of the data packet 215 and determines whether the destination network address of the data packet 215 matches the service address 220. Upon determining that data packet 215 matches the service address 220, the forwarding node 120 applies a forwarding policy 125 to determine where to forward the data packet 215. In certain embodiments, the forwarding node 120 is configured to retrieve the forwarding policy 125 from a storage module of the forwarding node 120 prior to applying the forwarding policy 125.

If, for example, the forwarding node 120 is connected to servicing node 131, and the forwarding policy 125 indicates to forward the data packet 215 to servicing node 131, then the forwarding node 120 sends the data packet 215 to the servicing node 131.

In other example embodiment, the forwarding node 120 is connected to the servicing node 131 and servicing node 132. If the forwarding policy 120 indicates that the servicing node 131 should be selected, then the forwarding node 120 forwards data packet 215 to the servicing node 131. In some embodiments, the forwarding policy 125 may indicate a criterion for selecting a servicing node between the servicing node 131 and the servicing node 132.

In some embodiments, the criterion of the forwarding policy 125 can indicate that the selection should be based on a source network address of the data packet 215. Forwarding node 120 retrieves a source network address of the data packet 215. The source network address may include one or more of an IP address, a transport layer address, and a link layer address. Forwarding node 120 is configured to make the selection based on the retrieved source network address.

In other embodiments, the forwarding node 120 applies a hashing function to the retrieved source network address in accordance to a criterion of the forwarding policy 125. In some embodiments, the forwarding node 120 is configured to look up a table based on the retrieved source network address. In certain embodiments, forwarding node 130 is configured to process only a portion of the retrieved source network address to determine a servicing node. After the forwarding node 120 determines and selects a servicing node based on the forwarding policy 125 criterion, the forwarding node 120 sends data packet 215 to the selected servicing node.

In some embodiments, prior to receiving data packet 215, the forwarding node 120 can receive one or more indications that either servicing node 131 or servicing node 132 are capable of handling data packets for the service address 220. In certain embodiments, the forwarding node 120 can include a prior forwarding policy and generate the forwarding policy 125 according to the indications and the prior forwarding policy.

In other embodiments, the forwarding node 120 is configured to receive the forwarding policy 125 from the network controller 300. In further embodiments, the forwarding node 120 stores the forwarding policy 125 to a storage module of the forwarding node 120 prior to applying the forwarding policy 125.

Figure 5:
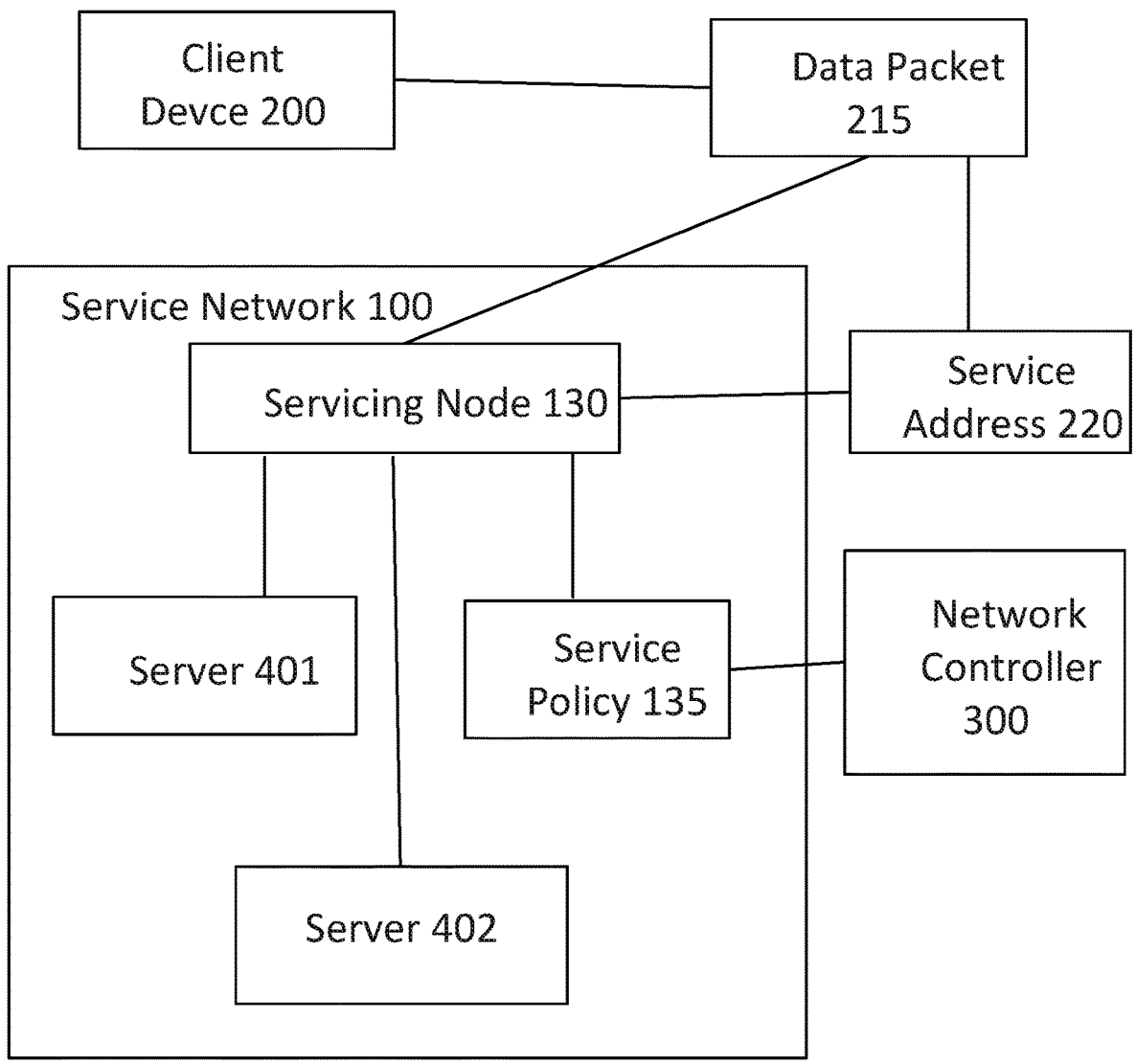
FIG. 5 is a block diagram showing an environment of a servicing node in a service data network.

Referencing now to FIG. 5, a block diagram of an example servicing node 130 and environment thereof is shown, according to an example embodiment. Details of service data network 100 and environment thereof are previously described in FIG. 1. The servicing node 130 is configured to receive a data packet 215 of client device 200. The servicing node 130 examines the data packet 215 and determines whether the data packet 215 matches service address 220. Upon determining that the data packet 215 matches the service address 220, the servicing node 130 processes the data packet 215.

In some embodiments, the data packet 215 includes a service request. The service request can include a HTTP request, an IP header, a HTTP cookie, a FTP command, a video/music/file service request, or a piece of data indicating a request for a service. The servicing node 120 processes the service request of the data packet 215 and uses service policy 135 to select a server (for example, server 401). The servicing node 130 sends the service request of the data packet 215 to the selected server 401.

In some embodiments, servicing node 130 can be connected to the server 401 and server 402, which are both capable of serving the service request of the data packet 215, and the servicing node 130 selects a server according to the service policy 135.

In some embodiments, the service policy 135 may indicate a selection criterion which is based on information of the client device 200, such as a network address of client device 200, a user identity, a HTTP cookie, a session identifier or a pattern in a data packet. The servicing node 130 extracts the necessary information from data packet 215 according to the selection criterion. In certain embodiments, the servicing node 130 does not select a server immediately after processing the service request of the data packet 215. In these embodiments, the servicing node 130 extracts additional information from data packets of a subsequent service session received from the client device 200 in order to apply the selection criterion. In one embodiment, servicing node 501 selects a server based on a server load balancing criterion indicated in service policy 135.

In some embodiments, the servicing node 130 can retrieve the service policy 135 from storage module. In other embodiments, the servicing node 130 receives the service policy 135 from the network controller 300.

Figure 6:
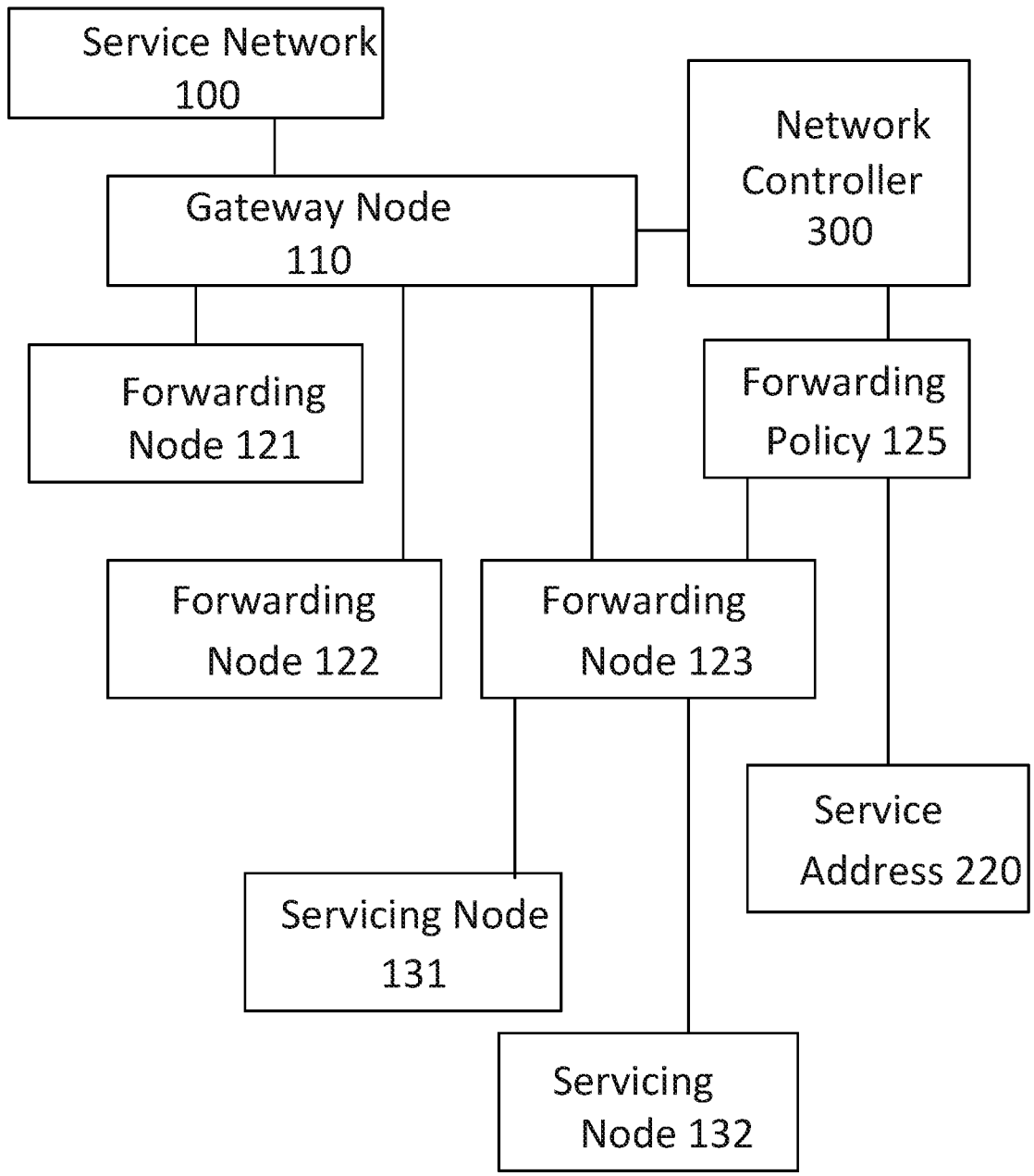
FIG. 6 is a block diagram showing an example forwarding node joining a service data network.

FIG. 6 is a block diagram showing an example forwarding node joining a service data network. In the example embodiment of FIG. 6, the service data network 100 includes at least a gateway node 110, forwarding nodes 121 and 122 before the forwarding node 123 joins the service network 100. The forwarding node may join the service data network 100 when the service data network 100 is required to increase capacity to serve additional client devices or service sessions.

In some embodiments, the forwarding node 123 is configured to receive a forwarding policy 125 from the network controller 300. The forwarding policy 125 can include the service address 220. In certain embodiments, the forwarding node 123 is configured with service address 220 prior to receiving forwarding policy 125. In some embodiments, the forwarding node 123 informs the gateway node 110 that forwarding node 123 has joined the service network 100. In other embodiments, the forwarding node 123 informs gateway node 110 based on the forwarding policy 125. The forwarding node 123 can process a routing protocol in conjunction with the gateway node 110, and the forwarding node 123 notifies the gateway node 110 using the routing protocol. The forwarding node 123 can includes the service address 220 in the notification to the gateway node 110.

According to an example embodiment, the forwarding node 123 can establish connections to the servicing node 131 and the servicing node 132. The forwarding node 123 can establish the connections to the servicing nodes 131 and 132 in accordance to forwarding policy 125. The forwarding policy 125 can include criteria for packet forwarding. In certain embodiments, the forwarding node 123 is configured to store the forwarding policy 125 in a storage module and to apply the forwarding policy 125 to select a servicing node, as described in FIG. 4.

The forwarding node 123 may inform the gateway node 110 after establishing connections to servicing nodes 131 and 132. In some embodiments, the forwarding node 123 establishes a connection with gateway node 110 prior to informing gateway node 110. In other embodiments, the forwarding node 123 establishes a routing protocol session with gateway node 110 and informs the gateway node 110 using the routing protocol session.

In some embodiments, network controller 300 can configured to inform the gateway node 110 that forwarding node 123 is available. The gateway node 110 updates a prior forwarding policy after being made aware of the forwarding node 123 in order to include the forwarding node 123. For example, if prior to including the forwarding node 123, the gateway node 110 is connected to the forwarding nodes 121 and 122, then after connecting to forwarding node 123, the gateway node 110 updates the prior forwarding policy in such a manner that the updated forwarding policy includes the forwarding nodes 121, 122 and 123.

Figure 7:
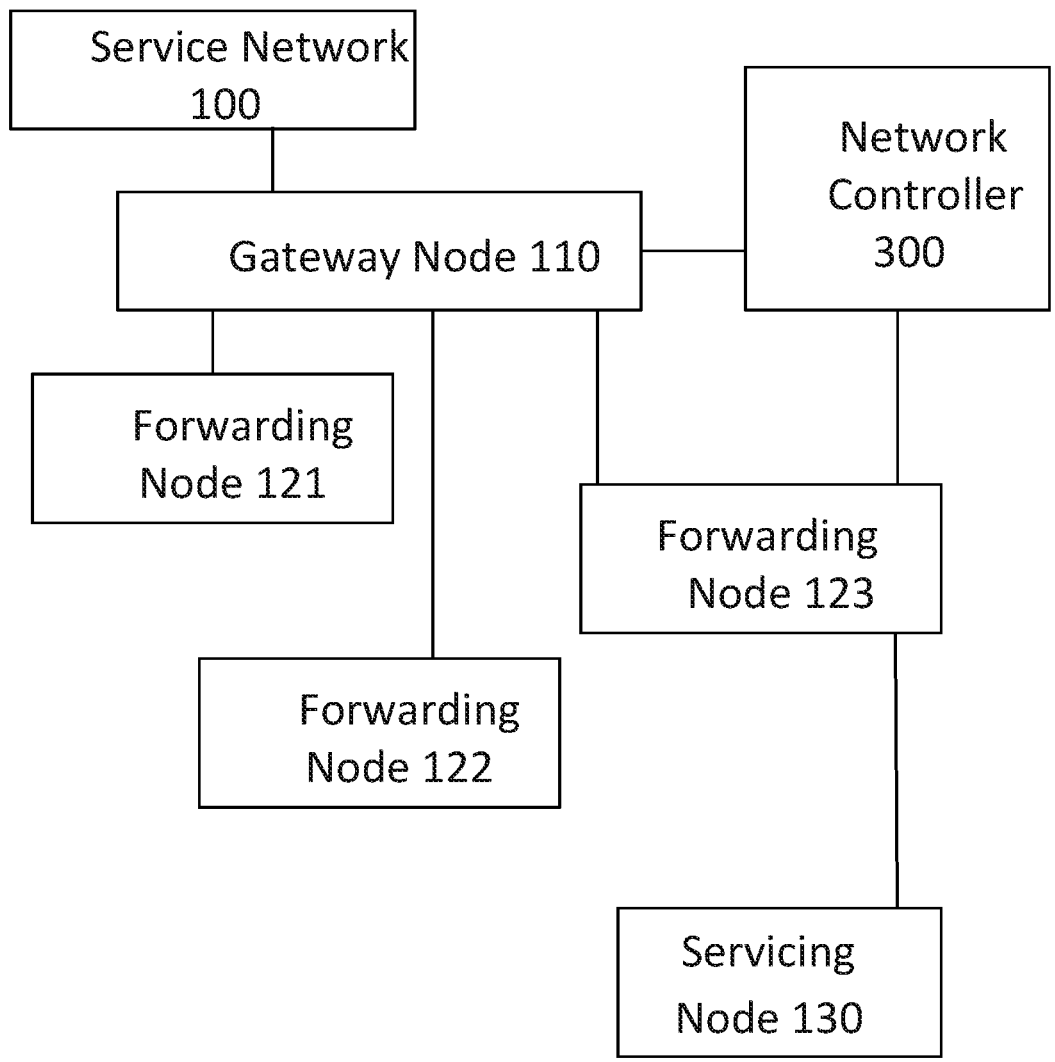
FIG. 7 is a block diagram showing an example forwarding node leaving a service data network.

FIG. 7 is a block diagram showing an example of a forwarding node leaving a service data network. In example embodiment of FIG. 7, the service data network 100 includes at least a gateway node 110, and forwarding nodes 121, 122, and 123. The forwarding node 123 is leaving the service network 100. The service network 100 may reduce its capability to serve in response to a reduced demand for service sessions.

In some embodiments, the forwarding node 123 receives an indication to leave service network 100 from the network controller 300. The forwarding node 123 may inform gateway node 110 that the forwarding node 123 is no longer participating in service network 100. The forwarding node 123 can inform the gateway node 110 via a routing protocol session with the gateway node 110. In certain embodiments, the network controller 300 can inform the gateway node 110 that the forwarding node 123 is no longer available. The gateway node 110 updates a prior forwarding policy associated with the gateway node 110 to make sure that the forwarding node 123 is no longer selectable based on the updated forwarding policy. In some embodiments, the gateway node 110 removes a connection to the forwarding node 123 since the forwarding node 123 is no longer selectable.

In some embodiments, the forwarding node 123 may remove an existing connection to servicing node 130. In certain embodiments, the network controller 300 informs the servicing node 130 to remove an existing connection to the forwarding node 123.

Figure 8:
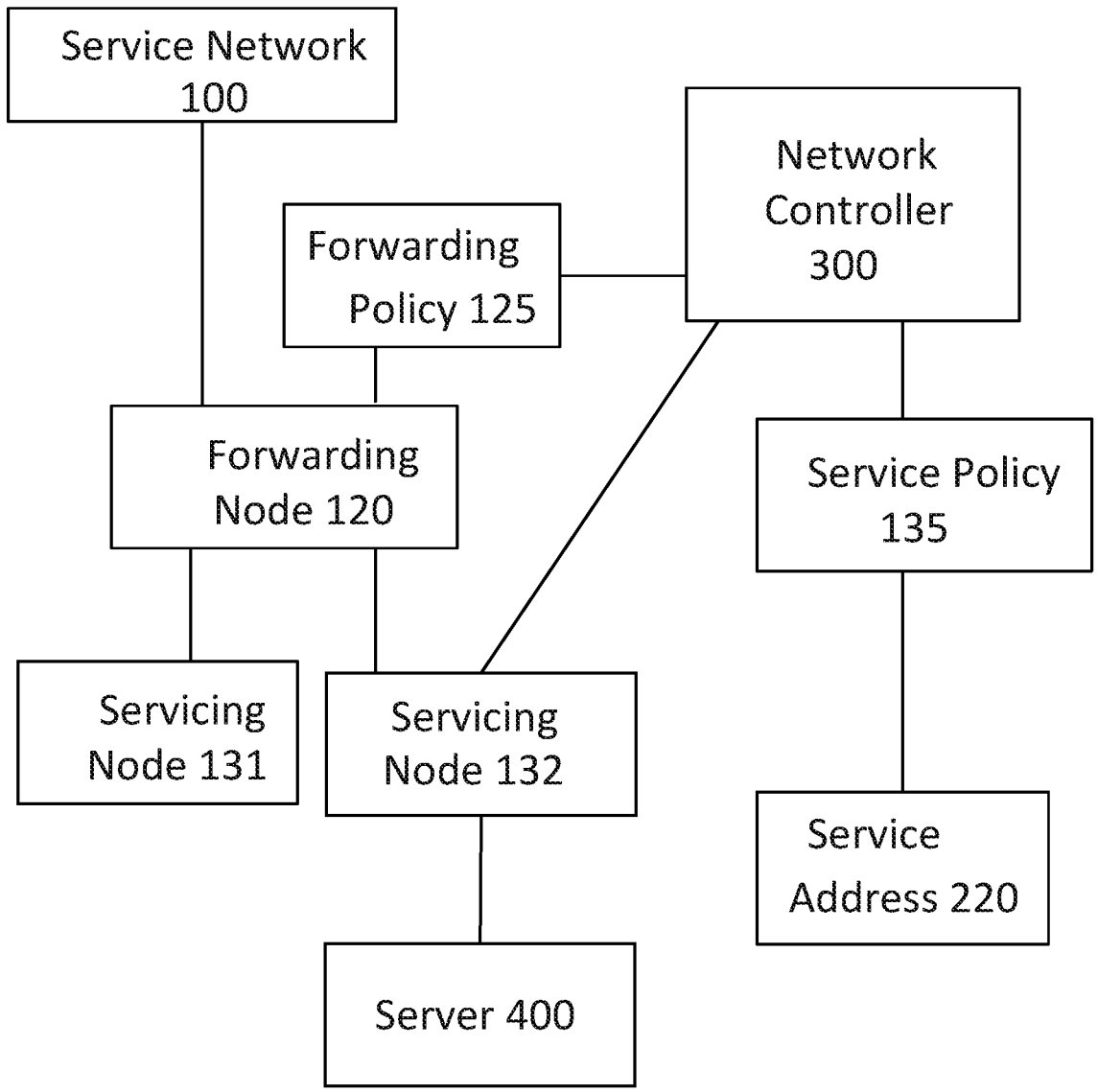
FIG. 8 is a block diagram showing an example servicing node joining a service data network.

FIG. 8 is a block diagram showing an example servicing node joining a service data network. In the example embodiment of FIG. 8, the service data network 100 includes forwarding node 120 and servicing node 131. Servicing node 132 is added to the service data network 100. The servicing node 132 may receive the service policy 135 from the network controller 300. The service policy 300 includes the service address 220. In some embodiments, the service policy 135 includes information about server 400 so that the servicing node 132 can select the server 400 to serve a client service session. In other embodiments, the service policy 135 includes information associated to forwarding node 120. The servicing node 132 establishes a connection with forwarding node 120 according to service policy 135.

In some embodiments, the forwarding node 120 is made aware of the presence of servicing node 132 upon receipt of forwarding policy 125 from the network controller 300. The forwarding node 120 can further establish a connection to the servicing node 132 according to the forwarding policy 125. In certain embodiments, the forwarding node 120 is connected to the servicing node 131 before it becomes aware of the servicing node 132 and includes a prior forwarding policy. Forwarding node 120 updates the prior forwarding policy to include forwarding policy 125 and servicing node 132. The forwarding policy 125 can include both the servicing node 131 and the servicing node 132. Forwarding node 120 replaces the prior forwarding policy with forwarding policy 125. The updated forwarding policy can be stored in storage module of the forwarding node 120 to be applied later.

Figure 9:
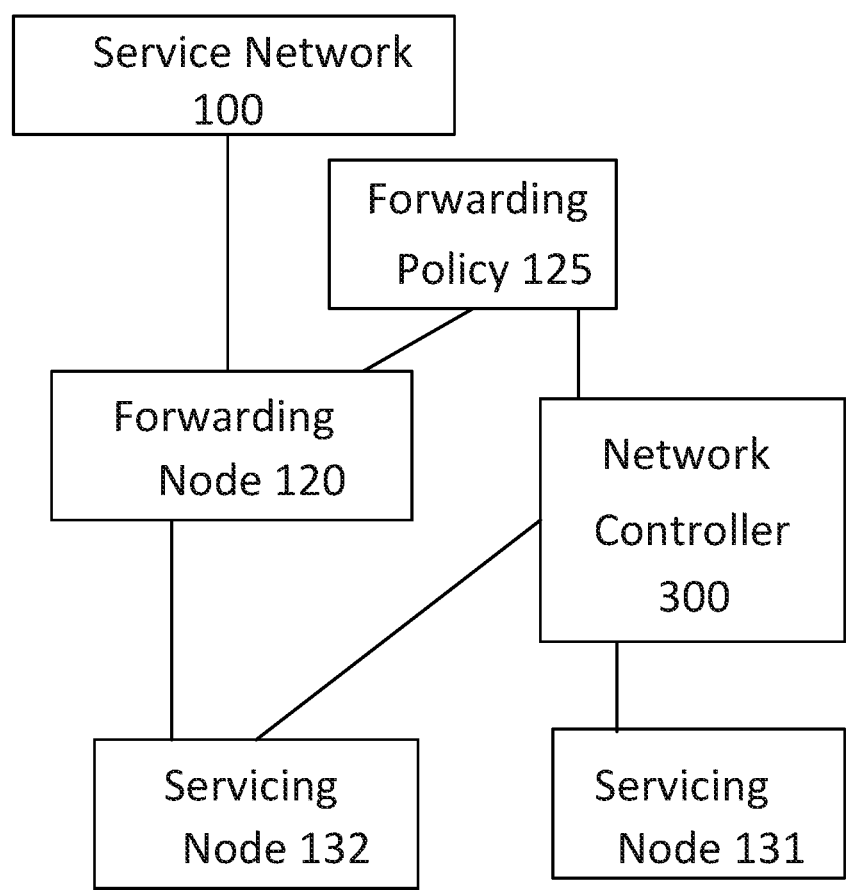
FIG. 9 is a block diagram showing an example servicing node leaving a service data network.

FIG. 9 is a block diagram showing an example of a servicing node leaving a service data network. In example embodiment of FIG. 9, the service data network 100 includes at least a forwarding node 120 and two servicing nodes 131 and 132 connected to forwarding node 120. The servicing node 132 is leaving the service network 100. The service network 100 may reduce its capability to serve upon reduction in the demand for service sessions.

In an example embodiment, the servicing node 132 receives an indication from network controller 300 to exit the service network 100. The servicing node 132 may further inform the forwarding node 120. In some embodiments, the network controller 300 informs the forwarding node 120 that servicing node 132 is no longer available in service network 100. In certain embodiments, the forwarding node 120 receives indication of service node 132 leaving upon receipt of forwarding policy 125. The forwarding node 120 removes an existing connection with servicing node 132 after receiving the indication. The forwarding node 120 can update a pre-stored forwarding policy with the forwarding policy 125 so that servicing node 132 cannot be selected using the updated forwarding policy.

In some embodiments, the network controller 300 indicates to the servicing node 131 that servicing node 132 is no longer available in service network 100. The network controller 300 can provide the indication to servicing node 131 via a service policy.

Referencing back to FIG. 1, it can be appreciated by one skilled in the art that various modifications can be applied to the components of the service data network and environment thereof. For instance, in some embodiments, the gateway node can include the functionality of a forwarding node. Sending data packets from a gateway node to a forwarding node may be conducted over an internal system network interface or a software interface. The forwarding node functionality in a gateway node can be disabled and enabled by the network controller.

In further embodiments, a forwarding node can include the functionality of a servicing node. Sending data packets from a forwarding node to a servicing node may be carried out over an internal system bus or network interface, or over a software interface or API. The network controller disables and enables the servicing node functionality of the forwarding node.

In other embodiments, a servicing node includes the functionality of a server. The network controller disables and enables the server functionality of a servicing node. In some embodiments, a first forwarding node connects to a second forwarding node, and the first forwarding node has a forwarding policy to send a data packet of the service address to the second forwarding node, which forwards the data packet to a servicing node.

In some embodiments, different servicing nodes may have different system capabilities. A forwarding policy of a forwarding node considers the different system capabilities of the servicing nodes. In certain embodiments, different forwarding nodes have different forwarding policies, while in other embodiments the different forwarding nodes have the same forwarding policy. The network controller can determine a forwarding policy based on the different system capabilities of the servicing nodes.

In certain embodiments, functionality of a network controller can be included in a gateway node, a forwarding node, or a servicing node.

In some embodiments, a service network is configured to start with a network node, wherein the network node has combined functionalities of a gateway node, a forwarding node, and a servicing node. The service network is configured subsequently to include additional forwarding nodes and servicing nodes as described herein.

In certain embodiments, the service network is configured to serve a second service address, where at least one or more of a gateway node, forwarding nodes, and servicing nodes would process service sessions for the second service address in addition to the above mentioned service address. In some embodiments, the service network may share one or more of a gateway node, forwarding nodes, and servicing nodes with a second service network serving a second service address.

Figure 10:
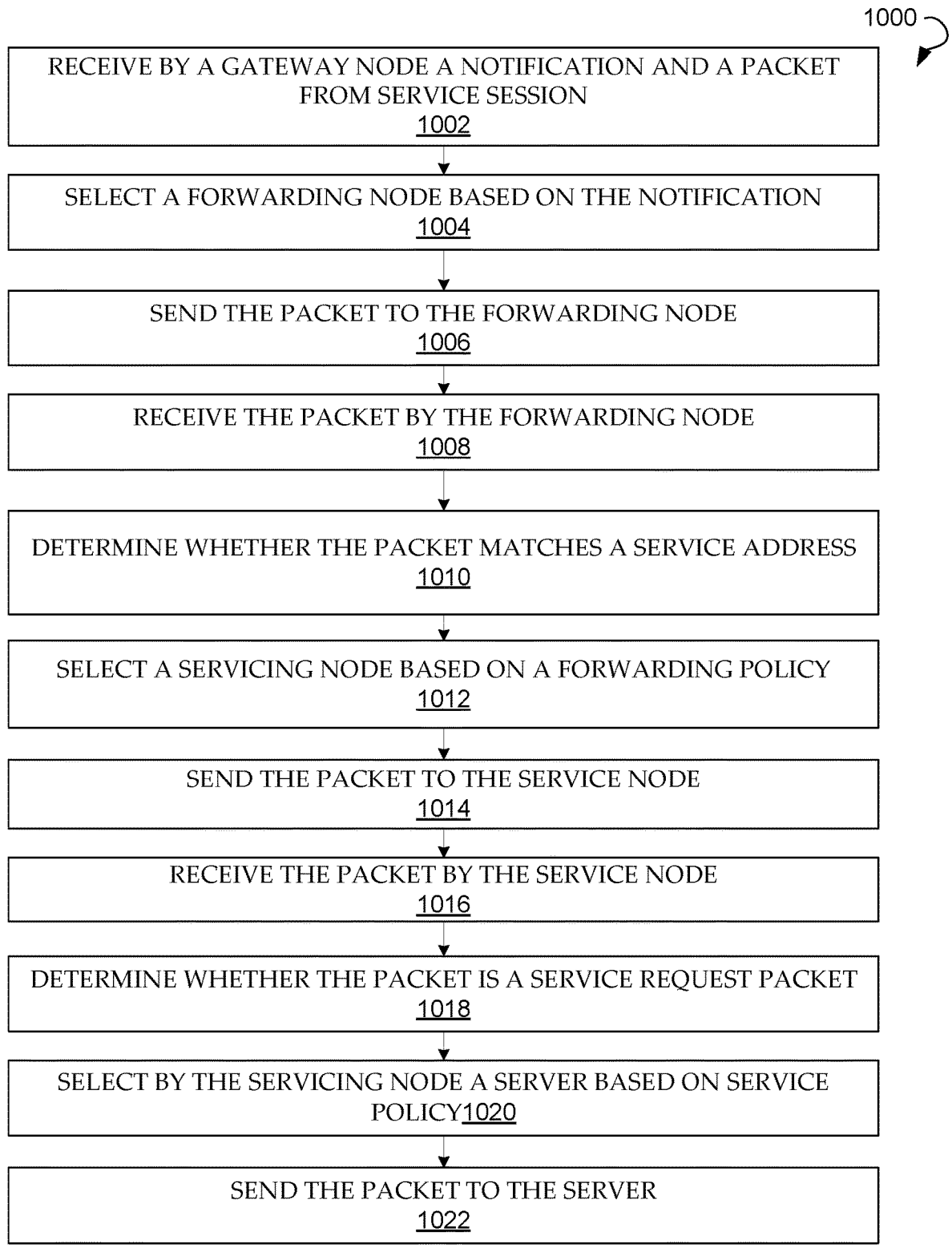
FIG. 10 is a process flow diagram showing a method for distributing a service session from a client to servers, according to an example embodiment.

Referring now to FIG. 10, steps of an example method 1000 for distributing a service session from a client to servers is shown, according to an example embodiment. In some embodiments the steps may be combined, performed in parallel, or performed in a different order. The method 1000 of FIG. 10 may also include additional or fewer steps than those illustrated. The steps of the method 1000 can be executed by components of a service data network 100 shown in FIG. 1-5.

In step 1002, a notification and the packet belonging to the service session are received by a gateway node of the service data network 100. The notification may contain a service address associated with the services session and an address associated with a forwarding node.

In step 1004, a forwarding node is selected by the gateway node based on the notification. In step 1006, the packet is sent to the selected forwarding node. In step 1008, the packet is received by the forwarding node.

In step 1010, the forwarding node determines whether the packet matches a service address, with the service address being associated with the service session. Responsive to the determination, in step 1012, a service node is selected by the forwarding node based on a forwarding policy. The forwarding policy may comprise an address associated with a service node or may contain a criterion as to how to select a service node from a plurality of the servicing nodes of the service data network 100.

In step 1014, the packet is sent by the forwarding node to the selected servicing node. In step 1016, the packet is received by the servicing node. In step 1018, the servicing node determines whether the packet is a service request packet. Responsive to the determination, in step 1020, a server configured to serve the service request packet is selected by the servicing node based on a service policy. The service policy may comprise a criterion for selecting the server based, for example, on service address, an address of a client service where the packets of the service session are sent from, and so forth. In step 1022, the packet is sent to the selected server.

Figure 11:
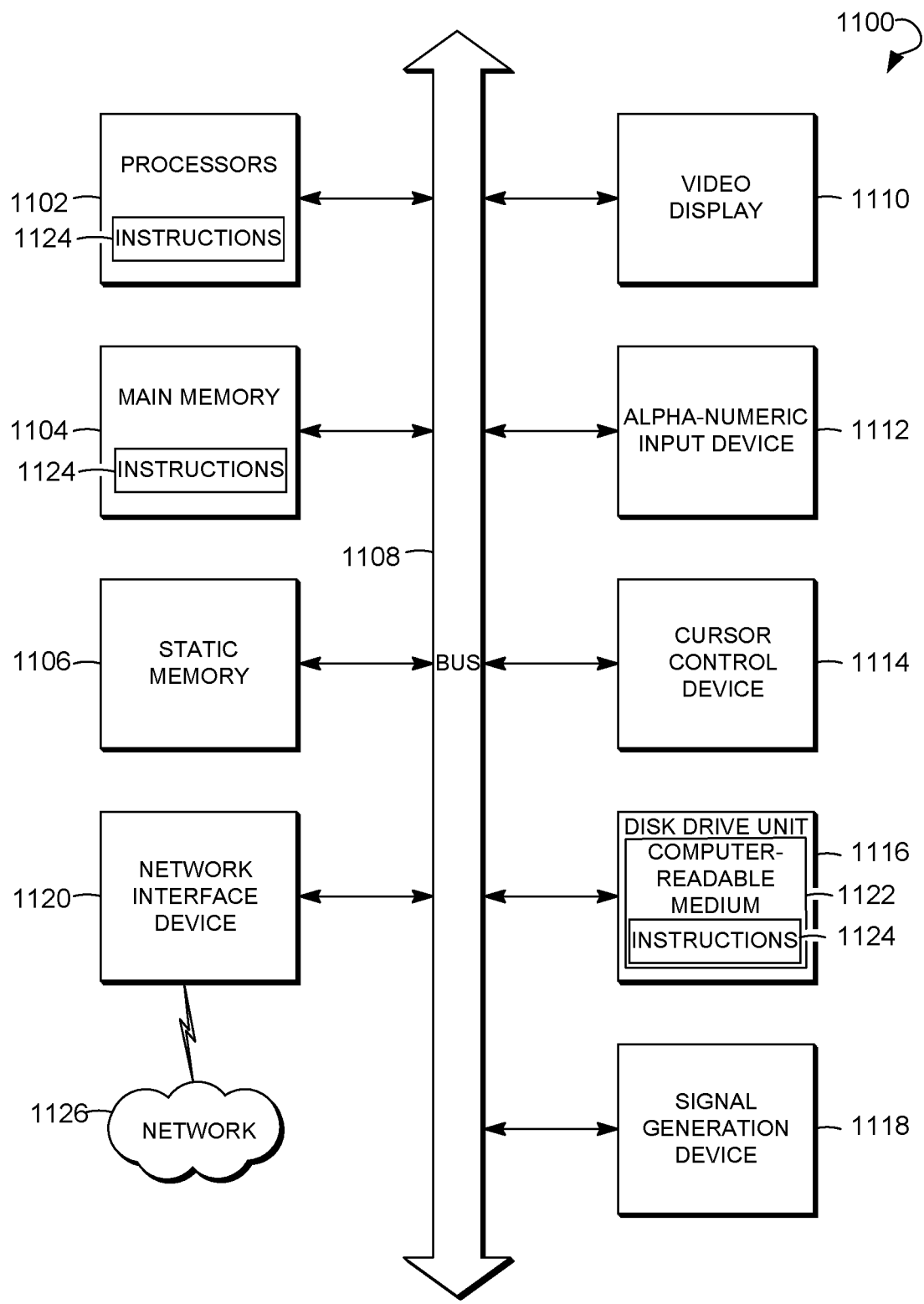
FIG. 11 shows a diagrammatic representation of a computing device for a machine in the example electronic form of a computer system, within which a set of instructions for causing the machine to perform any one or more of the methodologies discussed herein, can be executed.

FIG. 11 shows a diagrammatic representation of a machine in the example electronic form of a computer system 1100, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor or multiple processors 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 may also include an alphanumeric input device 1112 (e.g., a keyboard), a cursor control device 1114 (e.g., a mouse), a disk drive unit 1116, a signal generation device 1118 (e.g., a speaker), and a network interface device 1120.

The disk drive unit 1116 includes a non-transitory computer-readable medium 1122, on which is stored one or more sets of instructions and data structures (e.g., instructions 1124) embodying or utilized by any one or more of the methodologies or functions described herein. The instructions 1124 may also reside, completely or at least partially, within the main memory 1104 and/or within the processors 1102 during execution thereof by the computer system 1100. The main memory 1104 and the processors 1102 may also constitute machine-readable media.

The instructions 1124 may further be transmitted or received over a network 1126 via the network interface device 1120 utilizing any one of a number of well-known transfer protocols (e.g., HTTP).

While the computer-readable medium 1122 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, DVDs, RAM, read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for distributing service sessions are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for dynamically distributing a service session from a client device, the system comprising:
   a plurality of forwarding nodes; and
   a gateway node configured to:
     receive, from the client device, a packet of the service session, the packet being associated with a source network address;
     determine that the packet matches a service address in a forwarding policy;
     make a first selection by selecting, from the plurality of forwarding nodes, at least two forwarding nodes based on the service address and the forwarding policy, the at least two forwarding nodes serving the service address;
     upon selecting the at least two forwarding nodes, determine that the forwarding policy includes a first criterion instructing to select between the at least two forwarding nodes based on the source network address of the packet;
     based on the determining, making a second selection by selecting a first forwarding node of the at least two forwarding nodes based on the source network address and the forwarding policy for sending the packet to the first forwarding node, the first forwarding node serving the source network address;
     determine that the forwarding policy includes a second criterion with instructions to forward both the packet and further packets associated with the service session through an identical forwarding path, the identical forwarding path including a plurality of nodes, each of the plurality of nodes being configured to send the packet and the further packets forward along the identical forwarding path, wherein both the packet and the further packets comprise the source network address and a session identifier associated with the service session, and wherein the source network address does not include a cookie;
     update the forwarding policy by setting the first forwarding node as selectable for forwarding the further packets associated with the service session and comprising the source network address and the session identifier;
   wherein the first forwarding node is configured to:
     receive the packet of the service session from the gateway node;
     determine that the packet matches the service address in the forwarding policy;
     make a first selection by selecting, from a plurality of servicing nodes, at least two servicing nodes based on the service address and the forwarding policy, the at least two servicing nodes serving the service address;
     upon selecting the at least two servicing nodes, determine that the forwarding policy includes a third criterion instructing to select between the at least two servicing nodes based on the source network address of the packet;
     based on the determining, select a first servicing node of the at least two servicing nodes based on the source network address and the forwarding policy, the first servicing node serving the source network address;
     determine that the forwarding policy includes the second criterion with the instructions to forward both the packet and the further packets comprising the session identifier through the identical forwarding path;
update the forwarding policy by setting the first servicing node as selectable for forwarding the further packets, wherein the first forwarding node and the first servicing node constitute the plurality of nodes of the identical forwarding path for the packet and the further packets comprising the source network address and the session identifier and are configured to send the packet and the further packets forward along the identical forwarding path; and
send the packet to the first servicing node for forwarding the packet, by the first servicing node, directly to a server of a plurality of servers, wherein the first servicing node selects the server based on a service policy.

2. The system of claim 1, wherein the forwarding policy comprises a further source network address.

3. The system of claim 2, wherein the first forwarding node is further configured to:
retrieve the source network address associated with the packet; and
compare the source network address to the further source network address in the forwarding policy.

4. The system of claim 2, wherein the source network address comprises an Internet Protocol (IP) address of the client device.

5. The system of claim 1, further comprising the plurality of servicing nodes, wherein the first servicing node of the plurality of servicing nodes is configured to:
receive the packet from the first forwarding node;
determine whether the packet is a service request packet; and
select the server to serve the service session.

6. The system of claim 5, wherein the gateway node is further configured to receive, from a network controller, the forwarding policy, the forwarding policy comprising the service address serviced by one or more of the plurality of forwarding nodes;
wherein each of the plurality of forwarding nodes is configured to receive, from the network controller, the forwarding policy, the forwarding policy further comprising the service address serviced by the plurality of servicing nodes; and
wherein each of the plurality of servicing nodes is further configured to receive, from the network controller, the service policy for selecting the server from the plurality of servers.

7. The system of claim 6, wherein each of the service address serviced by the one or more of the plurality of forwarding nodes and the service address serviced by the plurality of servicing nodes represents a network address for servicing the service session between the client device and the server.

8. The system of claim 1, wherein the packet comprises at least a destination network address, wherein the gateway node determines that the packet matches the service address by determining that the destination network address of the packet matches the service address included in the forwarding policy.

9. The system of claim 1, wherein the gateway node communicates with one or more of the plurality of forwarding nodes over a routing protocol session.

10. The system of claim 1, wherein the plurality of forwarding nodes includes at least the first forwarding node and a second forwarding node, the forwarding policy further including predetermined criteria for selecting one of the first forwarding node and the second forwarding node.

11. A method for dynamically distributing a service session from a client device, the method comprising:
receiving, by a gateway node, from the client device, a packet of the service session, the packet being associated with a source network address;
determining, by the gateway node, that the packet matches a service address in a forwarding policy;
making, by the gateway node, a first selection by selecting, from a plurality of forwarding nodes, at least two forwarding nodes based on the service address and the forwarding policy, the at least two forwarding nodes serving the service address;
upon selecting the at least two forwarding nodes, determining, by the gateway node, that the forwarding policy includes a first criterion instructing to select between the at least two forwarding nodes based on the source network address of the packet;
based on the determining, making, by the gateway node, a second selection by selecting, a first forwarding node of the at least two forwarding nodes based on the source network address and the forwarding policy for sending, by the gateway node, the packet to the first forwarding node, the first forwarding node serving the source network address;
determining, by the gateway node, that the forwarding policy includes a second criterion with instructions to forward both the packet and further packets associated with the service session through an identical forwarding path, the identical forwarding path including a plurality of nodes, each of the plurality of nodes being configured to send the packet and the further packets forward along the identical forwarding path, wherein both the packet and the further packets comprise the source network address and a session identifier associated with the service session, and wherein the source network address does not include a cookie;
updating, by the gateway node, the forwarding policy by setting the first forwarding node as selectable for forwarding the further packets associated with the service session and comprising the source network address and the session identifier;
receiving, by the first forwarding node, the packet of the service session from the gateway node;
determining, by the first forwarding node, that the packet matches the service address in the forwarding policy;
making, by the first forwarding node, a first selection by selecting, from a plurality of servicing nodes, at least two servicing nodes based on the service address and the forwarding policy, the at least two servicing nodes serving the service address;
upon selecting the at least two servicing nodes, determining, by the first forwarding node, that the forwarding policy includes a third criterion instructing to select between the at least two servicing nodes based on the source network address of the packet;
based on the determining, selecting, by the first forwarding node, a first servicing node of the at least two servicing nodes based on the source network address and the forwarding policy, the first servicing node serving the source network address;
determining, by the first forwarding node, that the forwarding policy includes the second criterion with the instructions to forward both the packet and the further packets comprising the session identifier through the identical forwarding path;

updating, by the first forwarding node, the forwarding policy by setting the first servicing node as selectable for forwarding the further packets comprising the source network address and the session identifier, wherein the first forwarding node and the first servicing node constitute the plurality of nodes of the identical forwarding path for the packet and the further packets comprising the session identifier and are configured to send the packet and the further packets forward along the identical forwarding path; and sending, by the first forwarding node, the packet to the first servicing node for forwarding the packet, by the first servicing node, directly to a server of a plurality of servers, wherein the first servicing node selects the server based on a service policy.

12. The method of claim 11, wherein the forwarding policy comprises a further source network address.

13. The method of claim 12, wherein the selecting the first servicing node from the plurality of servicing nodes based on the forwarding policy comprises:
retrieving the source network address associated with the packet; and
comparing the source network address to the further source network address in the forwarding policy.

14. The method of claim 11, further comprising:
receiving the packet by the first servicing node;
determining, by the first servicing node, whether the packet is a service request packet; and
selecting, by the first servicing node, the server to serve the service session.

15. The method of claim 11, further comprising:
receiving, by the gateway node, from a network controller, the forwarding policy, the forwarding policy comprising the service address serviced by one or more of the plurality of forwarding nodes;
receiving, by each of the plurality of forwarding nodes, from the network controller, the forwarding policy, the forwarding policy further comprising the service address serviced by the plurality of servicing nodes; and
receiving, by each of the plurality of servicing nodes, from the network controller, the service policy for selecting the server from the plurality of servers.

16. The method of claim 15, wherein each of the service address serviced by the one or more of the plurality of forwarding nodes and the service address serviced by the plurality of servicing nodes represents a network address for servicing the service session between the client device and the server.

17. The method of claim 11, wherein the packet comprises at least a destination network address, wherein the determining, by the gateway node, that the packet matches the service address includes determining that the destination network address of the packet matches the service address included in the forwarding policy.

18. The method of claim 11, wherein the plurality of forwarding nodes includes at least the first forwarding node and a second forwarding node, the forwarding policy further including predetermined criteria for selecting one of the first forwarding node and the second forwarding node.

19. A system for dynamically distributing a service session from a client device, the system comprising:
a plurality of forwarding nodes;
a plurality of servicing nodes; and
a gateway node configured to:
receive, from a network controller, a forwarding policy, the forwarding policy comprising a service address serviced by one or more of the plurality of forwarding nodes;
receive, from the client device, a packet of the service session, the packet being associated with a source network address;
determine that the packet matches the service address in the forwarding policy;
make a first selection by selecting, from the plurality of forwarding nodes, at least two forwarding nodes based on the service address and the forwarding policy, the at least two forwarding nodes serving the service address;
upon selecting the at least two forwarding nodes, determine that the forwarding policy includes a first criterion instructing to select between the at least two forwarding nodes based on the source network address of the packet;
based on the determining, make a second selection by selecting a first forwarding node of the at least two forwarding nodes based on the source network address and the forwarding policy for sending the packet to the first forwarding node, the first forwarding node serving the source network address;
determine that the forwarding policy includes a second criterion with instructions to forward both the packet and further packets associated with the service session through an identical forwarding path, the identical forwarding path including a plurality of nodes, each of the plurality of nodes being configured to send the packet and the further packets forward along the identical forwarding path, wherein both the packet and the further packets comprise the source network address and a session identifier associated with the service session, and wherein the source network address does not include a cookie;
update the forwarding policy by setting the first forwarding node as selectable for forwarding the further packets associated with the service session and comprising the source network address and the session identifier;
wherein the first forwarding node is configured to:
receive, from the network controller, the forwarding policy, the forwarding policy further comprising the service address serviced by the plurality of servicing nodes;
receive the packet of the service session from the gateway node;
determine that the packet matches the service address in the forwarding policy;
make a first selection by selecting, from the plurality of servicing nodes, at least two servicing nodes based on the service address and the forwarding policy, the at least two servicing nodes serving the service address;
upon selecting the at least two servicing nodes, determine that the forwarding policy includes a third criterion instructing to select between the at least two servicing nodes based on the source network address of the packet;
based on the determining, select a first servicing node of the at least two servicing nodes based on the source network address and the forwarding policy, the first servicing node serving the source network address;

determine that the forwarding policy includes the second criterion with the instructions to forward both the packet and the further packets comprising the session identifier through the identical forwarding path;

update the forwarding policy by setting the first servicing node as selectable for forwarding the further packets comprising the source network address and the session identifier, wherein the first forwarding node and the first servicing node constitute the plurality of nodes of the identical forwarding path for the packet and the further packets comprising the session identifier and are configured to send the packet and the further packets forward along the identical forwarding path; and send the packet to the first servicing node; and wherein the first servicing node of the plurality of servicing nodes is configured to:

receive, from the network controller, a service policy for selecting a server from a plurality of servers;

receive the packet from the first forwarding node;

determine whether the packet is a service request packet;

select, based on the service policy, the server to serve the service session; and forward the packet directly to the server of the plurality of servers.

* * * * *